(12) United States Patent
Hagihara et al.

(10) Patent No.: US 12,546,535 B2
(45) Date of Patent: Feb. 10, 2026

(54) APPARATUS FOR PRODUCING INORGANIC SPHEROIDIZED PARTICLES AND METHOD FOR PRODUCING INORGANIC SPHEROIDIZED PARTICLES

(71) Applicant: TAIYO NIPPON SANSO CORPORATION, Tokyo (JP)

(72) Inventors: Yoshiyuki Hagihara, Tokyo (JP); Yasuyuki Yamamoto, Tokyo (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 546 days.

(21) Appl. No.: 17/762,124

(22) PCT Filed: Sep. 11, 2020

(86) PCT No.: PCT/JP2020/034499
§ 371 (c)(1),
(2) Date: Mar. 21, 2022

(87) PCT Pub. No.: WO2021/060025
PCT Pub. Date: Apr. 1, 2021

(65) Prior Publication Data
US 2022/0349652 A1    Nov. 3, 2022

(30) Foreign Application Priority Data

Sep. 27, 2019 (JP) ................................. 2019-176600

(51) Int. Cl.
*F27B 1/00* (2006.01)
*C01B 33/18* (2006.01)
(Continued)

(52) U.S. Cl.
CPC .............. *F27B 1/005* (2013.01); *C01B 33/18* (2013.01); *C01F 5/02* (2013.01); *C01F 7/021* (2013.01);
(Continued)

(58) Field of Classification Search
CPC .......... F27B 1/005; C01B 33/18; F23D 14/02; F23D 14/22; F23D 91/02; F23D 14/48;
(Continued)

(56) References Cited

U.S. PATENT DOCUMENTS

| 4,443,180 A | * | 4/1984 | LeFrois | ................... | F23D 11/26 |
|---|---|---|---|---|---|
| | | | | | 431/11 |
| 5,876,683 A | * | 3/1999 | Glumac | ................ | C23C 16/453 |
| | | | | | 423/325 |

(Continued)

FOREIGN PATENT DOCUMENTS

| CN | 1721328 A | 1/2006 |
|---|---|---|
| CN | 102272424 A | 12/2011 |

(Continued)

OTHER PUBLICATIONS

EP1881286A1 Espacenet Machine Translation (Year: 2024).*

(Continued)

*Primary Examiner* — Seyed Masoud Malekzadeh
(74) *Attorney, Agent, or Firm* — Nixon & Vanderhye P.C.

(57) ABSTRACT

One object of the present invention is to provide an apparatus for producing inorganic spheroidized particles which can significantly reduce the amount of warming gas generated and suppress the generation of soot during combustion. The present invention provides an apparatus (10) for producing inorganic spheroidized particles, including a burner (11) for producing inorganic spheroidized particles, a vertical spheroidizing furnace (15), an ammonia supply source (12), an oxygen supply source (13), an ammonia supply line (L1) located between the ammonia supply source (12) and the burner (11) for producing inorganic spheroidized particles, and an oxygen supply line (L2) located between the oxygen supply source (13) and the burner (11) for producing inorganic spheroidized particles.

11 Claims, 10 Drawing Sheets

(51) Int. Cl.
*C01F 5/02* (2006.01)
*C01F 7/021* (2022.01)
*C01G 49/06* (2006.01)
*F23D 14/02* (2006.01)
*F23D 14/78* (2006.01)
*F23K 5/00* (2006.01)
*F23L 7/00* (2006.01)
*F27B 1/08* (2006.01)
*F27D 17/25* (2025.01)

(52) U.S. Cl.
CPC ............. *C01G 49/06* (2013.01); *F23D 14/02* (2013.01); *F23D 14/78* (2013.01); *F23K 5/00* (2013.01); *F23L 7/007* (2013.01); *F27B 1/08* (2013.01); *C01P 2004/32* (2013.01); *F23K 2300/204* (2020.05); *F27D 17/25* (2025.01)

(58) Field of Classification Search
CPC .. F23K 5/00; F23L 7/007; F23C 2900/99011; F23C 2900/21005; B01J 2/00
See application file for complete search history.

(56) References Cited

U.S. PATENT DOCUMENTS

| | | | | |
|---|---|---|---|---|
| 6,244,854 | B1 | 6/2001 | Satchell, Jr. et al. | |
| 6,352,680 | B1* | 3/2002 | Watson | C01B 17/04 423/237 |
| 6,638,057 | B2* | 10/2003 | Watson | F23D 14/22 431/174 |
| 8,196,409 | B2* | 6/2012 | Cankovic | F02C 3/20 60/737 |
| 8,252,212 | B2* | 8/2012 | Hagihara | C01F 7/021 431/185 |
| 8,272,859 | B2* | 9/2012 | Hagihara | B01J 2/02 431/185 |
| 8,393,892 | B2* | 3/2013 | Hagihara | F23D 14/24 431/185 |
| 9,366,432 | B2* | 6/2016 | Mitchell | F23R 3/32 |
| 9,586,219 | B2* | 3/2017 | Yamamoto | F23D 14/22 |
| 9,671,107 | B2* | 6/2017 | Yamamoto | F23D 14/58 |
| 9,822,967 | B2* | 11/2017 | Taylor | F23K 3/02 |
| 10,197,282 | B2* | 2/2019 | Mitchell | F23L 15/04 |
| 2002/0047110 | A1* | 4/2002 | Takao | B82Y 30/00 252/500 |
| 2009/0202955 | A1* | 8/2009 | Jang | F23D 11/38 239/589 |
| 2010/0167054 | A1* | 7/2010 | Hagihara | F23D 14/32 431/185 |
| 2011/0135775 | A1* | 6/2011 | Hagihara | F23D 14/22 425/7 |
| 2011/0256250 | A1* | 10/2011 | Igarashi | F23D 14/78 425/7 |
| 2011/0265463 | A1 | 11/2011 | Kojima et al. | |
| 2013/0269577 | A1* | 10/2013 | Taylor | F23L 7/007 110/104 B |
| 2016/0245505 | A1* | 8/2016 | Taylor | F23M 5/025 |
| 2016/0258630 | A1* | 9/2016 | Mitchell | F02C 3/22 |

FOREIGN PATENT DOCUMENTS

| | | | |
|---|---|---|---|
| CN | 102906408 A | 1/2013 | |
| CN | 103249668 A | 8/2013 | |
| CN | 207716413 U | 8/2018 | |
| EP | 1 881 286 | 1/2008 | |
| EP | 1881286 A1 * | 1/2008 | ........... C21C 5/4606 |
| JP | S58-145613 | 8/1983 | |
| JP | 3312228 | 8/2002 | |
| JP | 3331491 | 10/2002 | |
| JP | 2012-007785 | 1/2012 | |
| JP | 2012-206077 | 10/2012 | |
| JP | 2016-130619 | 7/2016 | |
| JP | 2016-169933 | 9/2016 | |
| JP | 2019-138565 | 8/2019 | |

OTHER PUBLICATIONS

Extended European Search Report mailed Sep. 27, 2023 in European Application No. 20869874.6, 8 pages.
Office Action mailed Mar. 15, 2024 in Chinese Application No. 202080065381.5, with English translation of Search Report, 12 pages.
Modern gas (oil) boiler user manual/edited by Yongming, Du.—Beijing: China Dadi Publishing House, Mar. 2003, p. 175, with English translation.
International Search Report for PCT/JP2020/034499 dated Nov. 24, 2020, 5 pages (with English Translation).
The Notification of the Second Office Action mailed Jan. 11, 2025 in Chinese Application No. 202080065381.5, with English translation, 19 pages.
Li Xianchun, Theory and Application of Combustion, Beijing: Metallurgical Industry Press, Mar. 31, 2019, pp. 165-166, with English translation.
Yang Shenzhong et al., Questions and Answers on Management and Maintenance of Industrial Boilers/Equipment and aintenance Engineering of China Mechanical Engineering Society, Beijing: Mechanical Industry Press, Oct. 31, 2018, pp. 301-303, with English translation.

* cited by examiner

APPARATUS FOR PRODUCING INORGANIC SPHEROIDIZED PARTICLES AND METHOD FOR PRODUCING INORGANIC SPHEROIDIZED PARTICLES

This application is the U.S. national phase of International Application No. PCT/JP2020/034499 filed Sep. 11, 2020 which designated the U.S. and claims priority to JP 2019-176600 filed Sep. 27, 2019, the entire contents of each of which are hereby incorporated by reference.

TECHNICAL FIELD

The present invention relates to an apparatus for producing inorganic spheroidized particles and a method for producing inorganic spheroidized particles.

BACKGROUND ART

Conventionally, a method for producing inorganic spheroidized particles (hereinafter, may be simply referred to as "spheroidized particles") by passing an inorganic powder raw material through a flame is known (Patent Documents 1 to 3).

For example, in an apparatus for producing inorganic spheroidized particles disclosed in Patent Document 2, as shown in FIG. 10, raw material powder is supplied from a raw material feeder (feeder) A and carried into a burner B with carrier gas supplied from a carrier gas supply device A'. Oxygen from an oxygen supply facility C and a fuel gas (liquefied petroleum gas: LPG) from the LPG supply facility D are supplied into the burner B. Then, an exhaust gas containing particles spheroidized in the flame in a vertical furnace E is cooled (temperature diluted) by air introduced from a passage F to the bottom of the vertical furnace E, and the spheroidized particles are collected by a cyclone G and a bag filter H in the subsequent stage.

In order to spheroidize the raw material powder in a flame formed by a burner, a high-temperature flame is required. Therefore, as the burner B shown in FIG. 10, an oxygen combustion burner using a fuel gas and pure oxygen (hereinafter, may be simply referred to as "oxygen burner") is usually used.

As such an oxygen burner, for example, Patent Document 1 discloses a diffusion type burner having a concentric double pipe structure in which a large number of small pipes are provided between the inner pipe and the outer pipe.

Further, Patent Documents 2 and 3 disclose a diffusion type oxygen burner having a concentric quadruple pipe structure. Specifically, the diffusion type burner disclosed in Patent Documents 2 and 3 supplies raw material powder into a combustion chamber using oxygen gas or an oxygen-enriched gas as carrier gas from the center, a fuel gas from the outer periphery thereof, and primary and secondary oxygen from the outer periphery thereof. A cooling-water passage for cooling the burner is provided on the outermost periphery.

As described above, in the oxygen burner disclosed in Patent Documents 1 to 3, since the fuel gas and the combustion-supporting gas (oxygen gas) are mixed and combusted in the combustion chamber, a high-temperature oxygen combustion flame can be obtained.

PRIOR ART DOCUMENTS

Patent Literature

Patent Document 1: Japanese Patent Application, First Publication No. Sho 58-145613

Patent Document 2: Japanese Patent No. 3331491
Patent Document 3: Japanese Patent No. 3312228

SUMMARY OF INVENTION

Problem to be Solved by the Invention

However, since the conventional oxygen burner disclosed in the Patent Documents 1 to 3 generally uses a fuel gas containing a carbon source such as city gas or LPG, a large amount of carbon dioxide, which is a warming gas, is generated at the time of combustion.

In addition, when incomplete combustion occurs, soot, which is solid carbon, is generated, so there is a possibility of mixing a small amount of carbon in the product inorganic spheroidized particles.

The present invention has been made in view of the above circumstances, and an object of the present invention is to provide an apparatus for producing inorganic spheroidized particles and a method for producing inorganic spheroidized particles which can significantly reduce the amount of warming gas generated and suppress the generation of soot during combustion.

Means for Solving the Problem

In order to achieve the above problems, the present invention has adopted the following configuration.

[1] Apparatus for producing inorganic spheroidized particles, including:
- a burner for producing inorganic spheroidized particles which uses a fuel gas containing ammonia and a combustion-supporting gas containing oxygen;
- a vertical spheroidizing furnace in which the burner for producing inorganic spheroidized particles is mounted vertically downward on the top thereof;
- an ammonia supply source;
- an oxygen supply source;
- an ammonia supply line located between the ammonia supply source and the burner for producing inorganic spheroidized particles; and
- an oxygen supply line located between the oxygen supply source and the burner for producing inorganic spheroidized particles.

[2] The apparatus for producing inorganic spheroidized particles according to [1], wherein the apparatus further includes a fuel supply source for auxiliary combustion, and a fuel supply line for auxiliary combustion located between the fuel supply source for auxiliary combustion and the burner for producing inorganic spheroidized particles.

[3] The apparatus for producing inorganic spheroidized particles according to [1] or [2], wherein the apparatus further includes a cyclone and a bag filter located downstream of the vertical spheroidizing furnace.

[4] The apparatus for producing inorganic spheroidized particles according to [1] or [3], wherein the apparatus further includes a fuel supply line for auxiliary combustion located between a fuel supply source for auxiliary combustion and the burner for producing inorganic spheroidized particles, and
the burner for producing inorganic spheroidized particles includes:
- a raw material powder supply path which supplies inorganic powder as raw material powder;
- a first fuel gas supply path which supplies a first fuel gas;
- a first combustion-supporting gas supply path which supplies a first combustion-supporting gas;

the ammonia supply line and the first fuel gas supply path are communicated with each other; and the oxygen supply line and the first combustion-supporting gas supply path are communicated with each other.

[5] The apparatus for producing inorganic spheroidized particles according to [4], wherein the fuel supply line for auxiliary combustion and the first fuel gas supply path are communicated with each other.

[6] The apparatus for producing inorganic spheroidized particles according to [4] or [5], wherein the burner for producing inorganic spheroidized particles further includes:

a second fuel gas supply path which supplies a second fuel gas, and a second combustion-supporting gas supply path which supplies a second combustion-supporting gas, the second fuel gas supply path and one or both of the ammonia supply line and the fuel supply line for auxiliary combustion are communicated with each other, and the oxygen supply line and the second combustion-supporting gas supply path are communicated with each other.

[7] The apparatus for producing inorganic spheroidized particles according to any one of [1] to [6], wherein the burner for producing inorganic spheroidized particles further includes a water-cooling jacket, and a cooling-water circulation line provided between a cooling-water inlet and a cooling-water outlet of the water-cooling jacket.

[8] The apparatus for producing inorganic spheroidized particles according to [7], wherein the apparatus further includes a heat exchanger provided in the ammonia supply line and the cooling-water circulation line.

[9] A method for producing inorganic spheroidized particles in which inorganic powder is melted and spheroidized by a burner flame formed by combustion of a fuel gas and a combustion-supporting gas containing oxygen, wherein ammonia is used as the fuel gas.

Effects of the Invention

Since the apparatus for producing inorganic spheroidized particles of the present invention uses ammonia containing no carbon source as a fuel gas, the amount of warming gas generated can be significantly reduced and the generation of soot during combustion can be suppressed.

The method for producing inorganic spheroidized particles of the present invention can significantly reduce the amount of warming gas generated and suppress the generation of soot during combustion.

DETAILED DESCRIPTION OF THE PREFERRED EMBODIMENTS

First Embodiment

Figure 1:
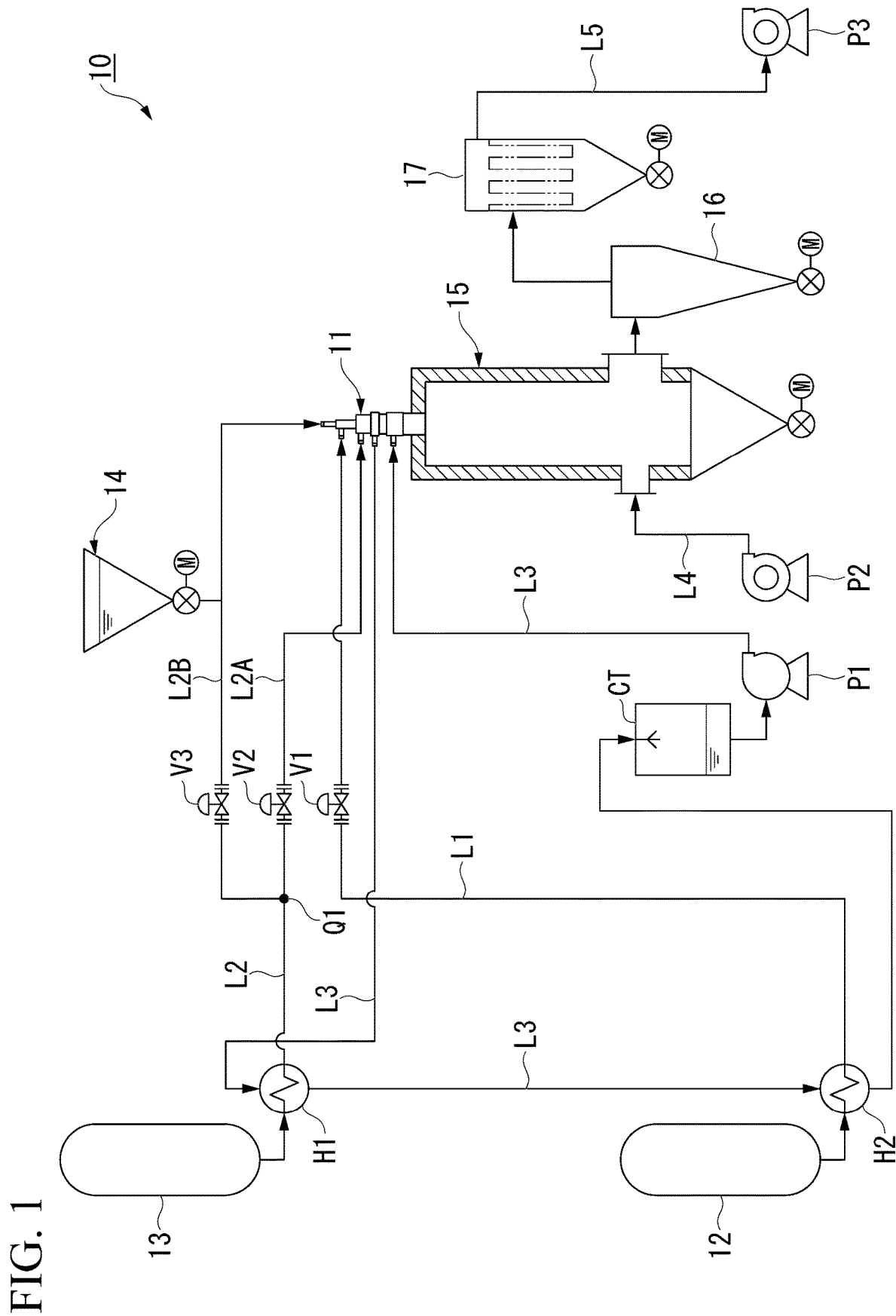
FIG. 1 is a system diagram showing an apparatus for producing inorganic spheroidized particles of the first embodiment according to the present invention.

Hereinafter, an apparatus for producing inorganic spheroidized particles of the first embodiment according to the present invention will be described in detail using drawings together with a method for producing inorganic spheroidized particles using the apparatus for producing inorganic spheroidized particles. In addition, in the drawings used in the following explanation, in order to make the features easy to understand, the featured parts may be enlarged for convenience, and the dimensional ratios of each component may not be the same as the actual ones.

(Apparatus for Producing Inorganic Spheroidized Particles)

First, the apparatus for producing inorganic spheroidized particles of the first embodiment according to the present invention will be described. FIG. 1 is a system diagram showing an example of an apparatus for producing inorganic spheroidized particles of the first embodiment according to the present invention.

As shown in FIG. 1, the apparatus 10 for producing inorganic spheroidized particles (hereinafter, may be simply referred to as "apparatus") of the present embodiment includes a burner 11 for producing inorganic spheroidized particles, an ammonia supply source 12, an oxygen supply source 13, a raw material powder supply source 14, a spheroidizing furnace 15, a cyclone 16, a bag filter 17, an ammonia supply line L1, an oxygen supply line L2, and a cooling-water circulation line L3.

(Burner for Inorganic Spheroidized Particles Producing)

Next, the burner 11 for producing inorganic spheroidized particles applicable to the apparatus 10 of the present embodiment will be described.

Figure 2:
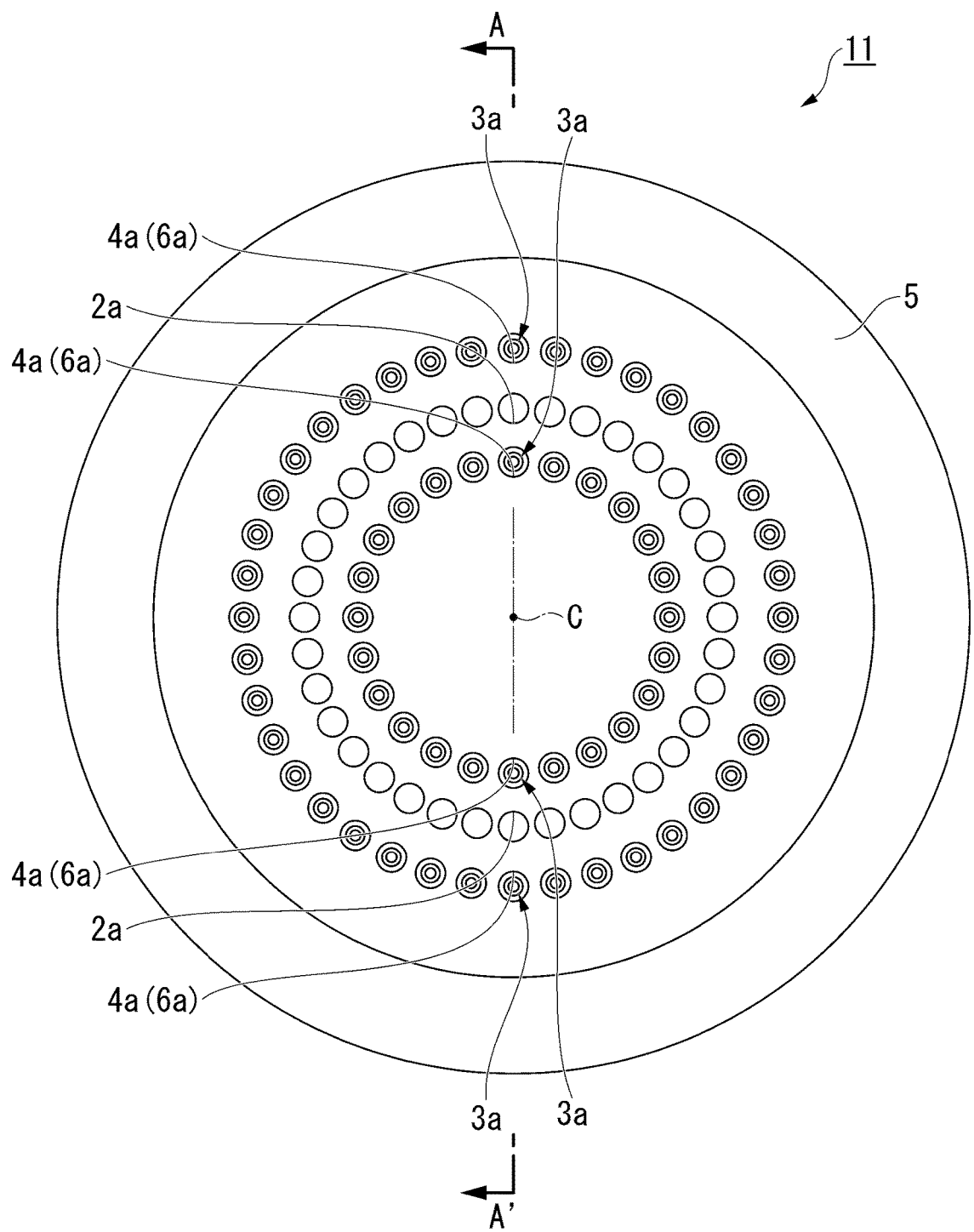
FIG. 2 is a plan view showing a burner for producing inorganic spheroidized particles applicable to the first embodiment.
Figure 3:
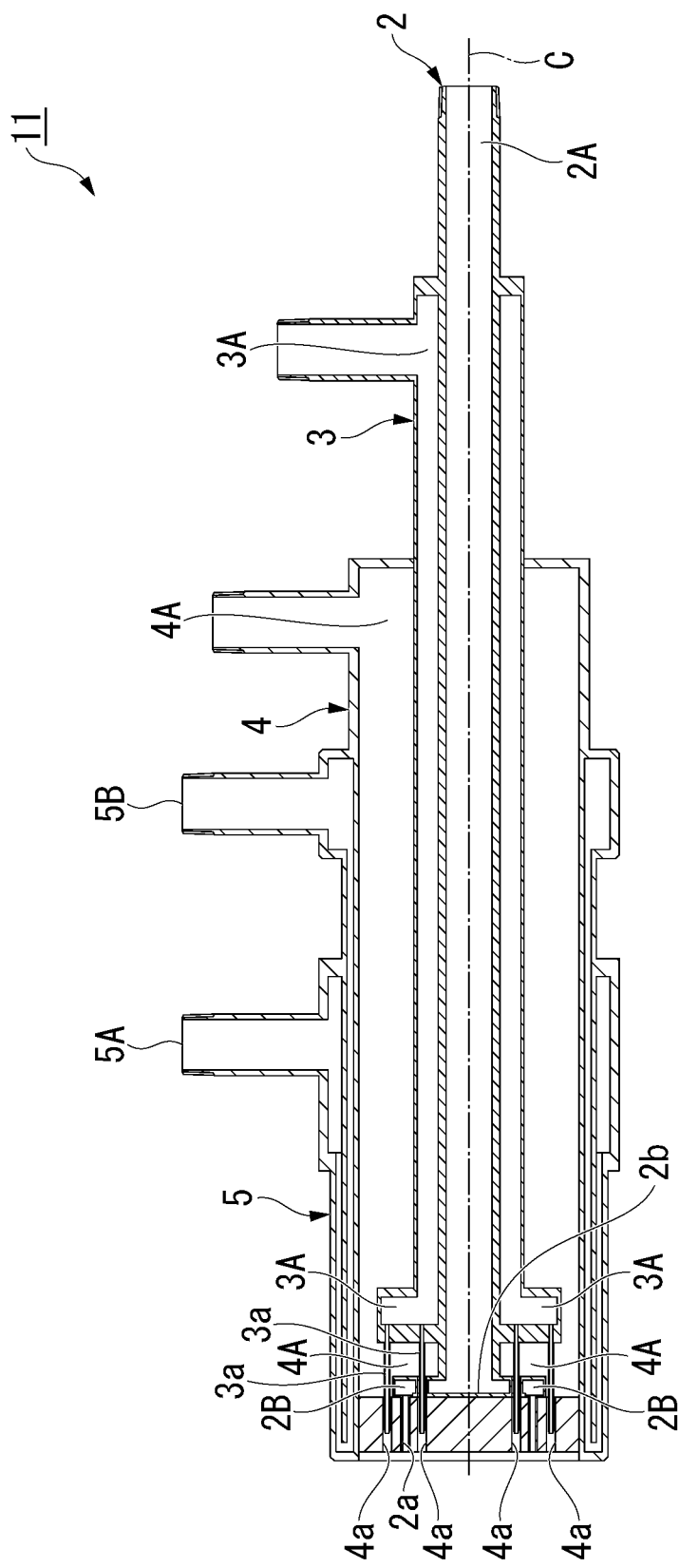
FIG. 3 is a cross-sectional view taken along the line A-A' shown in FIG. 2.
Figure 4:
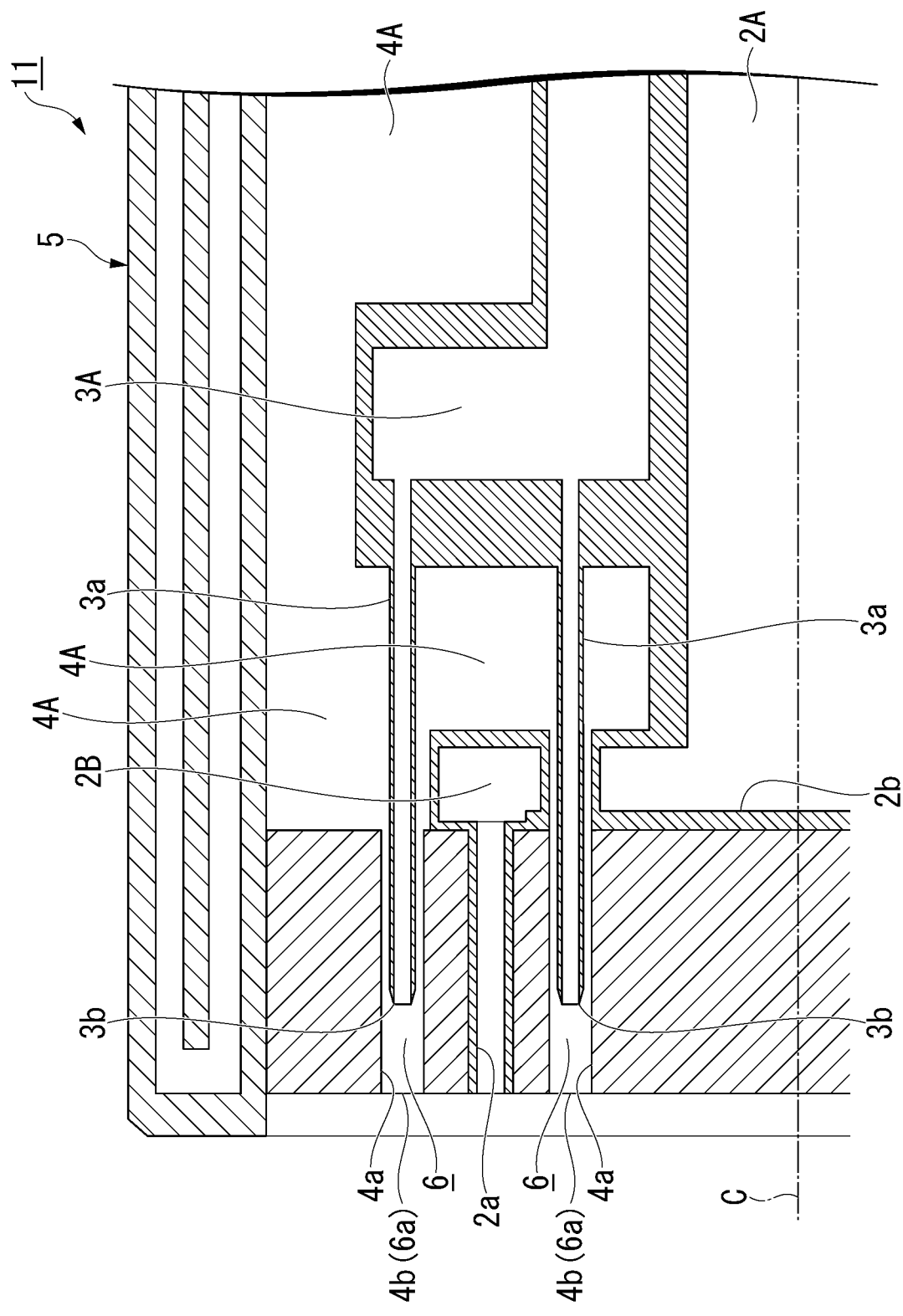
FIG. 4 is an enlarged cross-sectional view of the burner shown in FIG. 2.

FIGS. 2 to 4 show a burner for producing inorganic spheroidized particles (hereinafter, may be simply referred to as a burner) applicable to the apparatus 10 of the present embodiment. FIG. 2 shows a plan view of the burner from the tip side thereof, FIG. 3 a cross-sectional view taken along the line A-A' shown in FIG. 2, and FIG. 4 is an enlarged cross-sectional view of the tip end side of the burner.

As shown in FIGS. 2 to 4, the burner 11 has a concentric multi-pipe structure including a raw material powder supply pipe 2, a first fuel supply pipe 3, and a first combustion-supporting gas supply pipe 4, and a water-cooling jacket 5 from the central axis C of the burner 11 toward the outside in the circumferential direction. Further, the burner 11 is an oxygen combustion burner using a fuel gas and a combustion-supporting gas containing oxygen.

As shown in FIG. 3, the raw material powder supply pipe 2 extends along the axial direction of the burner 11 at the innermost portion of the concentric multi-pipe structure of the burner 11. The space inside the raw material powder supply pipe 2 is a raw material powder supply path 2A. As a result, it is possible to supply inorganic powder as raw material powder as a mixture with carrier gas.

The raw material powder supply path 2A branches into a plurality of raw material powder supply branched flow paths 2B extending radially from the central axis of the burner 1 at a portion near the tip in the axial direction of the burner 11.

Further, as shown in FIGS. 3 and 4, the raw material powder supply branched flow paths 2B communicate with raw material powder ejection holes 2a having an opening at the tip in the axial direction of the burner.

As a result, the burner 11 ejects the raw material powder in the direction parallel to the central axis C of the burner 11 through the raw material powder supply path 2A, a plurality of the raw material powder supply branched flow paths 2B, and a plurality of the raw material powder ejection holes 2a.

Specifically, as shown in FIG. 2, when the tip of the burner 11 is viewed in plan view, the openings of a plurality of the raw material powder ejection holes 2a are arranged annularly at equal intervals so as to be centered on the central axis of the burner 1. As a result, the heat generated by the flame formed inside or outside the raw material powder supply holes 2a can be efficiently received by the raw material powder.

Further, as shown in FIGS. 3 and 4, the raw material powder supply path 2A is provided with a dispersion plate 2b for uniformly dispersing the raw material powder into a plurality of the raw material powder supply branched flow paths 2B in the portion near the tip of the burner 11 in the axial direction.

Further, the raw material powder supply path 2A is connected to the raw material powder supply source 14 on the proximal end side through an oxygen gas supply line L2B described later.

The carrier gas is not particularly limited as long as it is a gas capable of carrying the raw material powder. Specifically, for example, when safety is taken into consideration, an inert gas such as nitrogen gas or argon gas can be used as the carrier gas. On the other hand, when oxygen or oxygen-enriched air is used as the carrier gas, the carrier gas can be also used as a combustion-supporting agent for the raw material powder. As a result, when forming a flame described later, a higher-temperature flame can be formed.

As shown in FIG. 3, the first fuel supply pipe 3 is provided so as to cover the outside of the raw material powder supply pipe 2. The central axis of the first fuel supply pipe 3 and the central axis of the raw material powder supply pipe 2 coincide with each other, and the first fuel supply pipe 3 is provided coaxially with the raw material powder supply pipe 2.

An annular space provided between the first fuel supply pipe 3 and the raw material powder supply pipe 2 is the first fuel gas supply path 3A for supplying the first fuel gas. In other words, the first fuel gas supply path 3A is provided so as to cover the outer periphery of the first powder supply path 2A.

The base end side of the first fuel gas supply path 3A is connected to the ammonia supply source 12, which is the first fuel gas, through the ammonia supply line L1.

Ammonia ($NH_3$) is used as the first fuel gas. If necessary, the first fuel gas may be diluted with an inert gas such as nitrogen gas or argon gas.

The tip of the first fuel gas supply path 3A is on the base end side in the axial direction of the burner 11 with respect to the position at which the raw material powder supply path 2A branches into a plurality of the raw material powder supply branched flow paths 2B. Therefore, the first fuel gas supply path 3A is not provided on the outer periphery of the portion near the tip of the first powder supply path 2A.

The annular space near the tip of the first fuel gas supply path 3A has a larger outer diameter than that of the base end portion and the central portion. The outer periphery of the annular space near the tip of the first fuel gas supply path 3A is preferably located outside the raw material powder ejection holes 2a. As a result, as shown in FIG. 2, when the tip of the burner 11 is viewed in plan view, the first fuel gas for forming a flame can be supplied to a position outside a plurality of the raw material powder ejection holes 2a.

As shown in FIGS. 3 and 4, the tip of the first fuel gas supply path 3A of which the diameter is expanded in the radial direction from the central axis C of the burner 11 is connected to a plurality of first fuel gas ejection nozzles (first fuel supply support flow paths) 3a extending in a direction parallel to the axial direction of the burner 11. The first fuel gas supply path 3A and the space inside a plurality of the first fuel gas ejection nozzles 3a are communicated with each other. As a result, the fuel gas can be supplied from the first fuel gas supply path 3A into a plurality of the first fuel gas ejection nozzles 3a. In other words, the first fuel gas supply path 3A branches into a plurality of the first fuel gas ejection nozzles 3a at the portion near the tip of the burner 11.

As shown in FIG. 3, the first combustion-supporting gas supply pipe 4 is provided so as to cover the outside of the first fuel supply pipe 3. The central axis of the first combustion-supporting gas supply pipe 4 coincides with the central axis of the first fuel supply pipe 3, and the first combustion-supporting gas supply pipe 4 is provided coaxially with the first fuel supply pipe 3 and the raw material powder supply pipe 2.

The annular space provided between the first combustion-supporting gas supply pipe 4 and the first fuel supply pipe 3 is the first combustion-supporting gas supply path 4A for supplying the first combustion-supporting gas. In other words, the first combustion-supporting gas supply path 4A is provided so as to cover the tip and the outer periphery of the first fuel gas supply path 3A.

The base end side of the first combustion-supporting gas supply path 4A is connected to the oxygen supply source 13, which is the first combustion-supporting gas, through the oxygen supply lines L2 and L2A.

The first combustion-supporting gas is not particularly limited as long as it is a gas capable of reacting with the first fuel gas to form a flame atmosphere. Examples of the first combustion-supporting gas include oxygen, and oxygen-enriched air.

The tip of the first combustion-supporting gas supply path 4A is on the tip side in the axial direction of the burner 11 with respect to the position at which the raw material powder supply path 2A branches into a plurality of the raw material powder supply particulate flow paths 2B. Therefore, the first combustion-supporting gas supply path 4A is provided so as to cover the outer periphery of the portion near the tip of the first powder supply path 2A.

The annular space near the tip of the first combustion-supporting gas supply path 4A has a smaller inner diameter than that of the base end portion and the central portion. The inner periphery of the annular space near the tip of the first combustion-supporting gas supply path 4A is preferably located inside the raw material powder ejection holes 2a. As a result, as shown in FIG. 2, when the tip of the burner 11 is viewed in plan view, the first combustion-supporting gas for forming a flame can be supplied to a position inside a plurality of the raw material powder ejection holes 2a.

As shown in FIGS. 3 and 4, the tip of the first combustion-supporting gas supply path 4A of which the diameter is expanded from the outside in the circumferential direction toward the central axis C of the burner 11 is connected to a plurality of first combustion-supporting gas supply holes (first combustion-supporting gas supply branched flow path) 4a which extend in a direction parallel to the axial direction of the burner 11. The first combustion-supporting gas supply path 4A and the space inside a plurality of the first combustion-supporting gas supply holes 4a are communicated with each other. As a result, the first combustion-supporting gas can be supplied from the first combustion-supporting gas supply path 4A to a plurality of the first combustion-supporting gas supply holes 4a. In other words, the first combustion-supporting gas supply path 4A branches into a plurality of the first combustion-supporting gas supply holes 4a at the portion near the tip of the burner 11.

As shown in FIG. 3, the water-cooling jacket 5 is provided so as to cover the outside of the first combustion-supporting gas supply pipe 4. The water-cooling jacket 5 is provided with a cooling-water inlet 5A and a cooling-water outlet 5B. As a result, the cooling-water supplied from the cooling-water inlet 5A into the flow path in the water-cooling jacket 5 is discharged from the cooling-water outlet 5B after cooling the burner 1 particularly near the tip of the burner 11.

In the burner 11 of the present embodiment, as shown in FIG. 4, the first fuel gas ejection nozzle 3a is located inside the first combustion-supporting gas supply hole 4a. Further, a tip 3b of the first fuel gas ejection nozzle 3a is located inside the first combustion-supporting gas supply hole 4a. That is, the first fuel gas ejection nozzle 3a opens inside the first combustion-supporting gas supply hole 4a.

When the first fuel gas is ejected from the tip 3b of the first fuel gas ejection nozzle 3a into the inside of the first combustion-supporting gas supply hole 4a, the combustion-supporting gas is supplied from the first combustion-supporting gas supply path 4A toward the inside of the first combustion-supporting gas supply hole 4a. Then, the first fuel gas and the first combustion-supporting gas are mixed inside the first combustion-supporting gas supply hole 4a in front of the tip 3b of the first fuel gas ejection nozzle 3a.

As described above, the space from the tip 3b of the first fuel gas ejection nozzle 3a to a tip 4b of the first combustion-supporting gas supply hole 4a is a first premixing chamber 6 for mixing the first fuel gas and the first combustion-supporting gas. Further, the opening at the tip 4b of the first combustion-supporting gas supply hole 4a becomes an opening 6a of the first premixing chamber 6.

In other words, the burner 11 includes a plurality of the first premixing chambers 6. These first premixing chambers 6 are located at a position near to the tip of the burner 11 in the axial direction. The first premixing chamber 6 communicates with one of the first fuel gas ejection nozzles 3a and one of the combustion-supporting gas supply holes 4a. The first premixing chamber 6 opens at the tip of the burner 1 in the axial direction.

A volume v1 of the first premixing chamber 6 is not particularly limited as long as the first fuel gas and the first combustion-supporting gas can be sufficiently mixed and there is no risk of flashback.

For example, when a total flow rate Q1 of the first fuel gas and the first combustion-supporting gas is 25 to 50 [Nm$^3$/h], the volume v1 [m$^3$] is preferably in a range from $3.0 \times 10^{-5}$ to $1.0 \times 10^{-3}$ [m$^3$], and more preferably in a range from $1.0 \times 10^{-4}$ to $1.0 \times 10^{-3}$ [m$^3$]. When the volume v1 is in the range from $1.0 \times 10^{-4}$ to $1.0 \times 10^{-3}$ [m$^3$], the first fuel gas and the first combustion-supporting gas can be sufficiently mixed.

Further, the offset distance L1 from the tip 3b of the first fuel gas ejection nozzle 3a to the tip 4b of the first combustion-supporting gas supply hole 4a is preferably in a range from $1.0 \times 10^{-3}$ to $1.0 \times 10^{-1}$ [m], and more preferably in a range from $2 \times 10^{-3}$ to $5 \times 10^{-2}$ [m].

Further, the number and volume of the first premixing chamber 6 can be appropriately selected according to the supply amount of the mixed gas of the first fuel gas and the first combustion-supporting gas, the number, the volume, and the layout (arrangement) of the raw material powder ejection hole 2a.

In the first premixing chamber 6, the first fuel gas and the first combustion-supporting gas are mixed in advance and ejected as a mixed gas from the opening 6a in a direction parallel to the axial direction of the burner 1.

Since the burner 11 uses ammonia containing no carbon source as the first fuel gas, the burner 11 includes a plurality of the first premixing chambers 6 having a small volume, and the first fuel gas and the first combustion-supporting gas are premixed in these first premixing chambers 6. As a result, the first fuel gas and the first combustion-supporting gas can be sufficiently mixed to improve the combustion efficiency, and there is no risk of flashback.

As shown in FIG. 2, when the tip of the burner 11 is viewed in plan view, the openings 6a of the plurality of the first premixing chambers 6 are arranged at equal intervals on the inside and outside of the raw material powder ejection holes 2a arranged in an annular shape centered on the central axis C of the burner 11 so as to be concentric circles. That is, the raw material powder ejection holes 2a are surrounded inside and outside by the openings 6a of the first premixing chambers 6.

In order to form a flame (hereinafter, also referred to as "first flame") by the mixed gas of the first fuel gas and the first combustion-supporting gas in the central portion (center portion) of the burner 11, the openings 6a of a plurality of the first premixing chambers 6 are arranged in an annular shape, and a plurality of the raw material powder ejection holes 2a are arranged in an annular shape so as to surround the outer periphery of the first flame in the burner 11. Further, in order to form a flame (hereinafter, also referred to as "second flame") by the mixed gas of the first fuel gas and the first combustion-supporting gas so as to surround the outer periphery of the raw material powder ejection holes 2a, the openings 6a of a plurality of the first premixing chambers 6 are arranged in an annular shape. As a result, the heat of the flame can be efficiently transferred to the raw material powder ejected from the raw material powder ejection holes 2a, and the raw material powder can be efficiently melted.

Further, by forming the second flame so as to surround the outer periphery of the raw material powder ejection holes 2a, the entrained air from the periphery of the burner 11 or the combustion exhaust gas in the furnace can be blocked, so that the efficiency of melting and spheroidizing of the inorganic powder can be improved.

The ammonia supply source 12 is a facility for storing ammonia used as the fuel gas. Ammonia is usually stored as a liquefied gas.

The ammonia supply line L1 is located between the ammonia supply source 12 and the burner 11. Specifically, the ammonia supply line L1 communicates with the base end side of the first fuel gas supply path 3A of the burner 11. In other words, the ammonia supply source 12 and the first fuel gas supply path 3A are connected through the ammonia supply line L1. As a result, the ammonia gas can be supplied to the burner 11 as the first fuel gas from the ammonia supply source 12.

The ammonia supply line L1 is provided with a heat exchanger H2, which will be described later, and a flow rate adjusting valve V1. Further, the ammonia supply line L1 may be provided with a vaporizer (not shown) for vaporizing liquid ammonia.

The oxygen supply source 13 is a facility for storing oxygen used as the combustion-supporting gas or the carrier gas. The method for storing oxygen is not particularly limited, but it is preferable to store it as liquefied oxygen as a mode in which a large capacity can be stored.

The oxygen supply line L2 is located between the oxygen supply source 13 and the burner 11.

Also, the oxygen supply line L2 branches into L2A and L2B at the Q1 point.

The oxygen supply line L2 is provided with a heat exchanger H1 which will be described later. Further, the oxygen supply line L2 may be provided with a vaporizer (not shown) for vaporizing liquid oxygen.

The branched oxygen supply lines L2A and L2B are provided with flow rate control valves V2 and V3, respectively.

The branched oxygen supply line L2A communicates with the base end side of the first combustion-supporting gas supply path 4A of the burner 11. In other words, the oxygen supply source 13 and the first combustion-supporting gas supply path 4A are connected through the oxygen supply lines L2 and L2A. As a result, oxygen gas can be supplied to the burner 11 as the first combustion-supporting gas from the oxygen supply source 13.

On the other hand, the branched oxygen supply line L2B communicates with the base end side of the raw material powder supply path 2A of the burner 11. In other words, the oxygen supply source 13 and the raw material powder supply path 2A are connected through oxygen supply lines L2 and L2B. As a result, oxygen gas can be supplied to the burner 11 as the carrier gas.

The raw material powder supply source 14 is a facility for storing the raw material powder, and is provided in the branched oxygen supply line L2B. The raw material powder supply source 14 and the raw material powder supply path 2A are connected through the oxygen supply line L2B. As a result, the inorganic powder, which is the raw material powder, can be supplied to the burner 11 together with the carrier gas (oxygen gas).

The form of the raw material powder supply source 14 is not particularly limited. For example, the raw material powder supply source 14 may have a raw material tank, a raw material-cutting mechanism, and the like.

The raw material powder is not particularly limited as long as it is a compound (inorganic powder) for which spherical particles are desired to be obtained. Specific examples of such a compound include inorganic oxides such as $SiO_2$, $Al_2O_3$, $MgO$ and $Fe_2O_3$.

The particle morphology of the raw material powder is not particularly limited, and may be non-spherical particles having corners or spherical particles having no corners.

The particle size of the raw material powder is preferably in the range from 1 to 500 μm, and preferably in the range from 1 to 100 μm. Here, if the particle size of the raw material powder is less than 1 μm, the particles aggregate due to static electricity, and if it exceeds 500 μm, it cannot be sufficiently heated in a burner flame, which is not preferable. On the other hand, if it is within the range above, it is preferable because the raw material powder can be sufficiently heated and spheroidized while being appropriately dispersed in the flame.

The cooling-water circulation line L3 is located between the cooling-water outlet 5B and the cooling-water inlet 5A of the water-cooling jacket 5 in the burner 11. The cooling-water circulation line L3 is provided with a cooling tower CT for storing cooling-water, a pump P1, a heat exchanger H1 and the heat exchanger H2.

In the cooling-water circulation line L3, the cooling-water in the cooling tower CT is supplied from the cooling-water inlet 5A into the water-cooling jacket 5 by the pump P1 and discharged from the cooling-water outlet 5B after the cooling of the burner 11 is completed. Next, high-temperature cooling-water discharged from the water-cooling jacket 5 is cooled by heat exchange with low-temperature liquefied oxygen or oxygen gas in the heat exchanger H1 provided over the cooling-water circulation line L3 and the oxygen supply line L2. Further, the cooling-water is cooled by heat exchange with low-temperature liquefied ammonia or ammonia gas in the heat exchanger H2 provided over the cooling-water circulation line L3 and the ammonia supply line L1, and then supplied into the cooling tower CT.

According to the apparatus 10 of the present embodiment, the cooling-water used for the water-cooling jacket 5 of the burner 11 can be used as a heat source for vaporizing or heating liquefied oxygen or liquefied ammonia.

The spheroidizing furnace 15 is a cylindrical vertical furnace, and the burner 11 is attached to the ceiling portion (furnace top portion) vertically downward so that the tip end side thereof faces the inside of the furnace.

An air introduction line L4 provided with a blower P2 is connected near the bottom of the spheroidizing furnace 15, from which cooling air can be introduced inside of the spheroidizing furnace 15 to lower the temperature of the discharged combustion gas.

A combustion gas discharge line L5 provided with an exhaust blower P3 is connected to the vicinity of the bottom of the spheroidizing furnace 15. As a result, the generated spheroidized particles are carried by the combustion gas and sent to the inlet of the cyclone 16.

In addition, a duct is provided at the outlet of the cyclone 16, and the duct is connected to the inlet of the bag filter 17.

(Method for Producing Inorganic Spheroidized Particles)

Next, a method for producing spheroidized particles using the device 10 will be described. In the method for producing inorganic spheroidized particles of the present embodiment, the inorganic powder is melted and spheroidized by the burner flame formed by the combustion of the fuel gas containing ammonia and the combustion-supporting gas containing oxygen.

As shown in FIGS. 1 to 4, first, the raw material powder supplied from the raw material powder supply source 14 is supplied into the raw material powder supply path 2A of the burner 11 using the carrier gas (oxygen gas) supplied from the oxygen supply source 13 through the oxygen supply lines L2 and L2B, and ejected from a plurality of the raw material powder ejection holes 2a toward the spheroidizing furnace 15.

At the same time, a predetermined amount of ammonia gas (first fuel gas) is sent from the ammonia supply source 12 into the first fuel gas supply path 3A of the burner 11 through the ammonia supply line L1, and a predetermined amount of oxygen gas (first combustion-supporting gas) is sent from the oxygen supply source 13 into the first combustion-supporting gas supply path 4A of the burner 11 through the oxygen supply lines L2 and L2A. Then, a mixed gas of ammonia gas (first fuel gas) and oxygen gas (first combustion-supporting gas) is ejected toward the spheroidizing furnace 15 from the openings 6a of a plurality of the first premixing chambers 6 of the burner 11. At this time, the raw material powder is surrounded by the first flame and the second flame formed by the combustion of the mixed gas ejected from the openings 6a of the first premixing chambers 6. As a result, the inorganic powder, which is the raw material powder, is melted and spheroidized.

The spheroidized particles are suspended in a mixed gas of the combustion gas generated from the burner 11 and the air introduced from the air introduction line L4, and sent into the cyclone 16 through the combustion gas discharge line L5 provided at the spheroidizing furnace 15. By mixing air with the combustion gas, the temperature of the gas introduced into the cyclone 16 is lowered, and the temperature becomes suitable for collecting particles in the cyclone 16.

In the cyclone 16, coarse spheroidized particles are collected from the spheroidized particles suspended in the gas. The gas derived from the cyclone 16 is sent to the bag filter 17, and fine spheroidized particles are collected from among the spheroidized particles.

In the method for producing inorganic spheroidized particles of the present embodiment, ammonia gas containing no carbon source is used as the first fuel gas. In order to efficiently combust the carbon-free substance, the first fuel gas and the first combustion-supporting gas are supplied into a plurality of the first premixing chambers 6 of the burner 11 and mixed in advance to form a flame. Then, the inorganic powder is put into the flame. In this way, by supplying the first fuel gas and the first combustion-supporting gas into the first premixing chambers 6, the combustion efficiency can be improved even when a substance containing no carbon source is used as the first fuel gas. Further, when the burner 11 is operated to combust, the possibility of flashback can be reduced.

As described above, in the apparatus (apparatus for producing inorganic spheroidized particles) 10 of the present embodiment, the burner 11 uses ammonia ($NH_3$) containing no carbon source as the fuel gas, so that it is possible to significantly reduce the amount of warming gas such as carbon dioxide ($CO_2$) generated. In addition, it is possible to suppress the generation of soot caused by the carbon source in the fuel and prevent soot from being contaminated into the product inorganic spheroidized particles.

Further, according to the method for producing inorganic spheroidized particles of the present embodiment, since the apparatus 10 is used, the amount of warming gas generated can be significantly reduced and the generation of soot during combustion can be suppressed.

According to the apparatus 10 of the present embodiment, the cooling-water used for the water-cooling jacket 5 of the burner 11 can be used as a heat source for vaporizing or heating liquefied oxygen or liquefied ammonia. Therefore, since it is not necessary to provide a large vaporizer or heater in the ammonia supply source 12, the ammonia supply passage L1, the oxygen supply source 13, and the oxygen supply line L2, it is possible to reduce the size of the apparatus and save energy.

Second Embodiment

Figure 5:
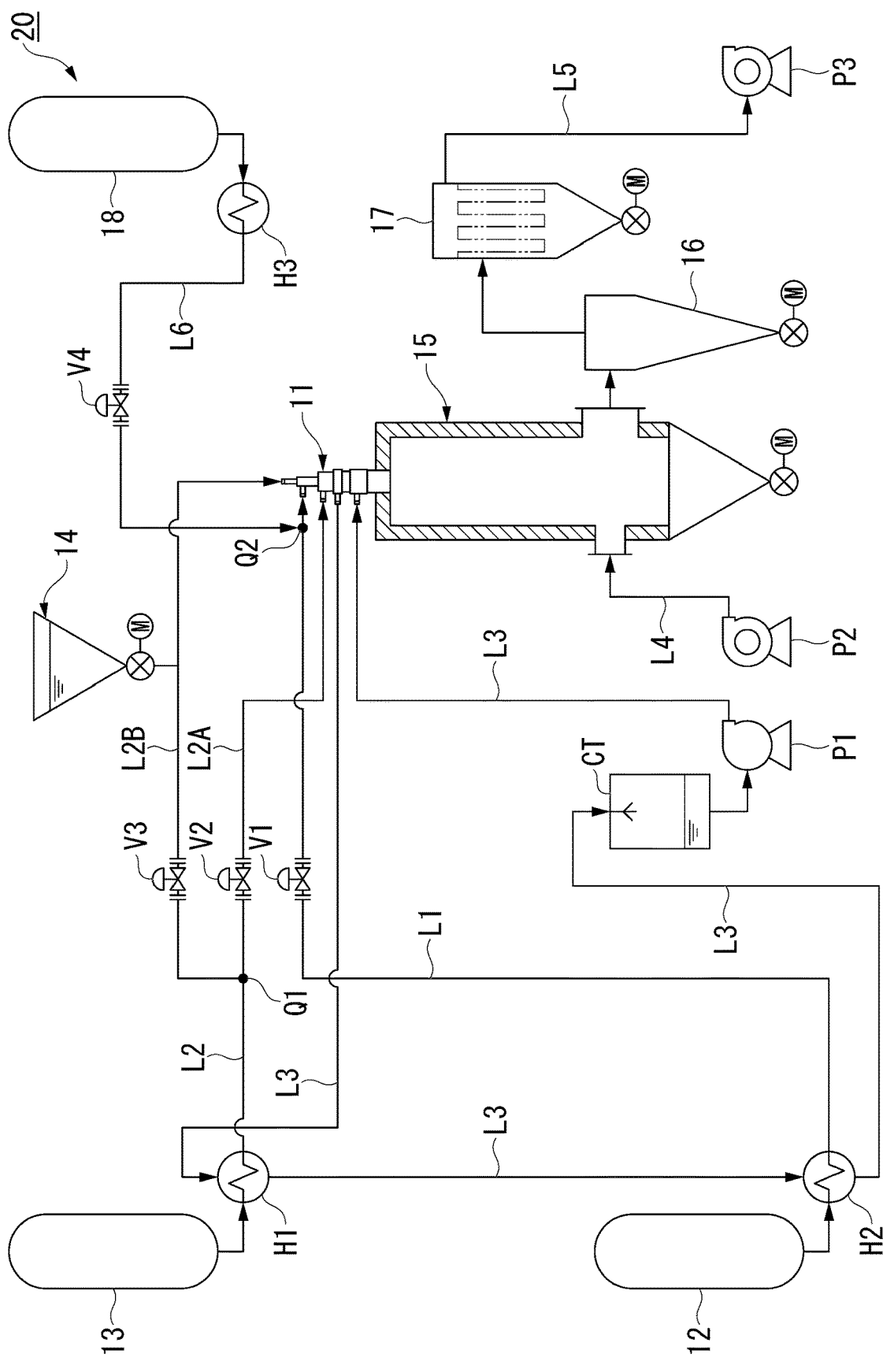
FIG. 5 is a system diagram showing an apparatus for producing inorganic spheroidized particles of a second embodiment according to the present invention.

Next, a second embodiment according to the present invention will be described. FIG. 5 is a system diagram showing an apparatus 20 according to the second embodiment of the present invention.

As shown in FIG. 5, the apparatus 20 of the present embodiment has a configuration different from that of the apparatus 10 of the first embodiment in that the apparatus 20 further includes the fuel supply source for auxiliary combustion 18 and the fuel supply line for auxiliary combustion L6. Therefore, regarding the apparatus 20 of the present embodiment, the same components as those of the first embodiment are designated by the same reference numerals, and the description thereof will be omitted.

(Apparatus for Producing Inorganic Spheroidized Particles)

As shown in FIG. 5, the apparatus 20 of the present embodiment (hereinafter, may be simply referred to as "apparatus") includes a burner 11 for producing inorganic spheroidized particles, the ammonia supply source 12, the oxygen supply source 13, the raw material powder supply source 14, the spheroidizing furnace 15, the cyclone 16, the bag filter 17, the ammonia supply line L1, the oxygen supply line L2, the cooling-water circulation line L3, the fuel supply source for auxiliary combustion 18, and the fuel supply line L6 for auxiliary combustion.

The fuel supply source for auxiliary combustion 18 is a facility for storing auxiliary fuel used as a part of fuel gas. In the apparatus 20 of the present embodiment, the ammonia gas used as the fuel gas has a lower combustion property than the conventional gaseous fuel containing a carbon source or hydrogen, so that the fuel for auxiliary combustion is supplied into the first fuel gas ejection nozzle 3a of the burner 11. Thereby, the flame temperature of the burner can be maintained high while reducing the carbon dioxide generated at the time of combustion, so that the raw material powder can be efficiently melted.

As the fuel for auxiliary combustion, for example, a gaseous fuel such as methane ($CH_4$) or propane ($C_3H_8$) can be used. Further, if the apparatus 10 has a liquid atomization mechanism, a liquid fuel such as kerosene or alcohol can also be used.

The fuel supply line for auxiliary combustion L6 is connected to the ammonia supply line L1 at the position Q2 of the ammonia supply line L1 near the burner 11. Specifically, the fuel supply line for auxiliary combustion L6 is located between the fuel supply source for auxiliary combustion 18 and the burner 11, and is connected to the base end side of the first fuel gas supply path 3A of the burner 11 through the ammonia supply line L1. In other words, the fuel supply source for auxiliary combustion 18 and the first fuel gas supply path 3A are connected through the fuel supply line for auxiliary combustion L6 and the ammonia supply line L1. As a result, the fuel for auxiliary combustion can be supplied to the burner 11 as a part of the first fuel gas from the fuel supply source for auxiliary combustion 18.

The fuel supply line for auxiliary combustion L6 is provided with a heat exchanger H3 and a flow rate control valve V4. Thereby, the temperature and the supply amount of the fuel for auxiliary combustion supplied to the burner 11 can be appropriately adjusted.

(Method for Producing Inorganic Spheroidized Particles)

Next, a method for producing spheroidized particles using the apparatus 20 will be described. In the method for producing inorganic spheroidized particles of the present embodiment, the inorganic powder is melted by the burner flame formed by combustion of the fuel gas containing ammonia and the fuel for auxiliary combustion, and the combustion-supporting gas containing oxygen, and the inorganic powder is spherical.

Further, according to the method for producing inorganic spheroidized particles of the present embodiment, the fuel supply source for auxiliary combustion 18 and the fuel supply line for auxiliary combustion L6 are used, and the fuel for auxiliary combustion is supplied to the first fuel gas ejection nozzle 3a when the burner 11 is ignited. Thereby, the flame temperature of the burner can be maintained high while reducing the carbon dioxide generated during combustion, and the raw material powder can be efficiently melted. Further, the fuel for auxiliary combustion may be used only at the time of ignition, and the supply of the fuel for auxiliary combustion may be stopped after the combustion of the burner 11 is stabilized, or the supply may be continued while adjusting the flow rate by the flow rate control valve V4.

As described above, according to the apparatus 20 of the present embodiment and the producing method, the same effects as those of the first embodiment can be obtained, and the combustion state of the burner 11 can be easily stabilized.

Third Embodiment

Figure 6:
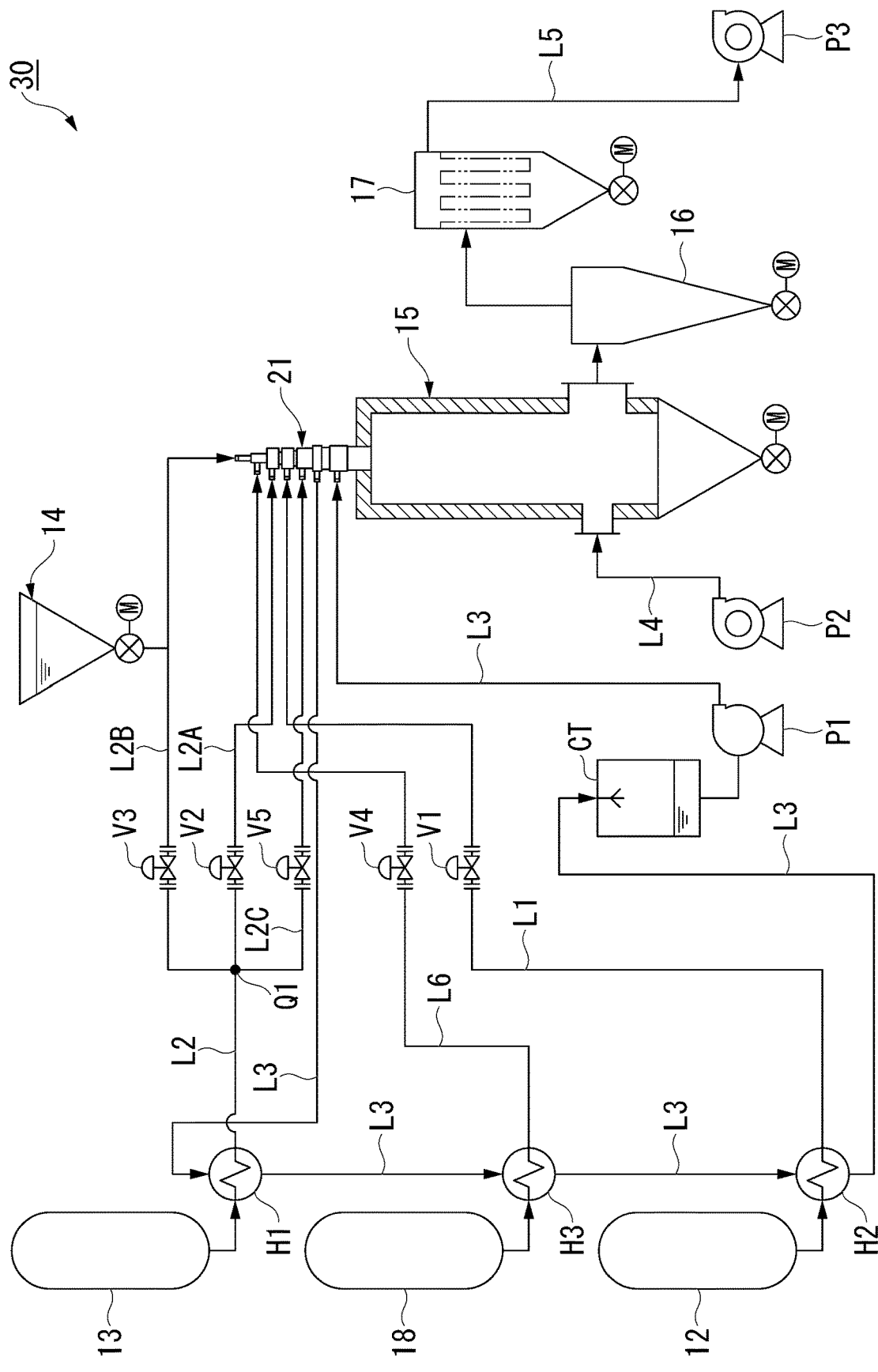
FIG. 6 is a system diagram showing an apparatus for producing inorganic spheroidized particles of a third embodiment according to the present invention.

Next, a third embodiment according to the present invention will be described. FIG. 6 is a system diagram showing an apparatus 30 according to the third embodiment of the present invention.

As shown in FIG. 6, the apparatus 30 of the present embodiment has a different configuration from that of the apparatus 20 of the second embodiment in that the configuration of the burner and the connection position of each supply line to the burner are different. Therefore, regarding the apparatus 30 of the present embodiment, the same components as those of the first and second embodiments are designated by the same reference numerals, and the description thereof will be omitted.
(Burner for Producing Inorganic Spheroidized Particles)

Figure 7:
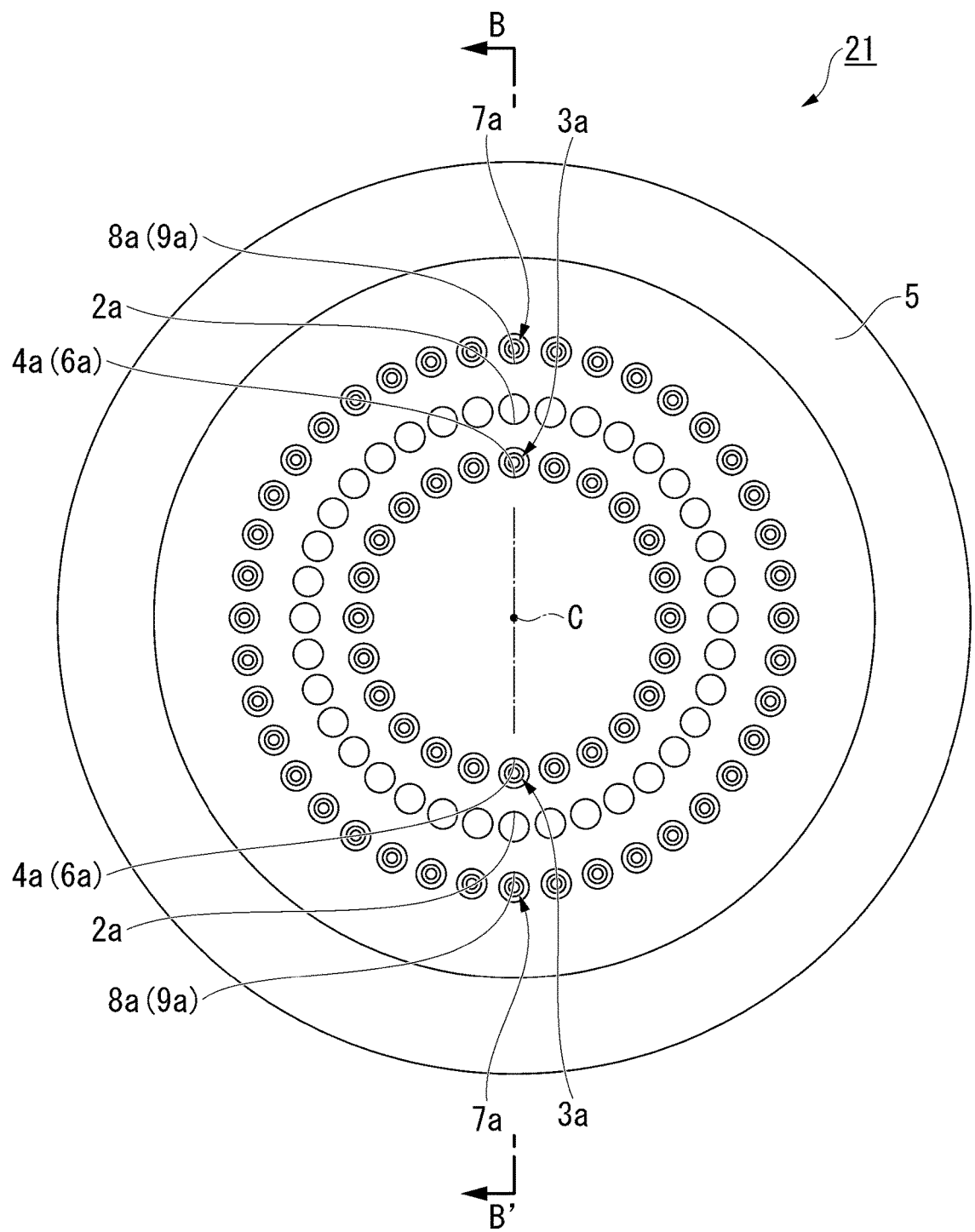
FIG. 7 is a plan view showing a burner for producing inorganic spheroidized particles applicable to the third embodiment.
Figure 8:
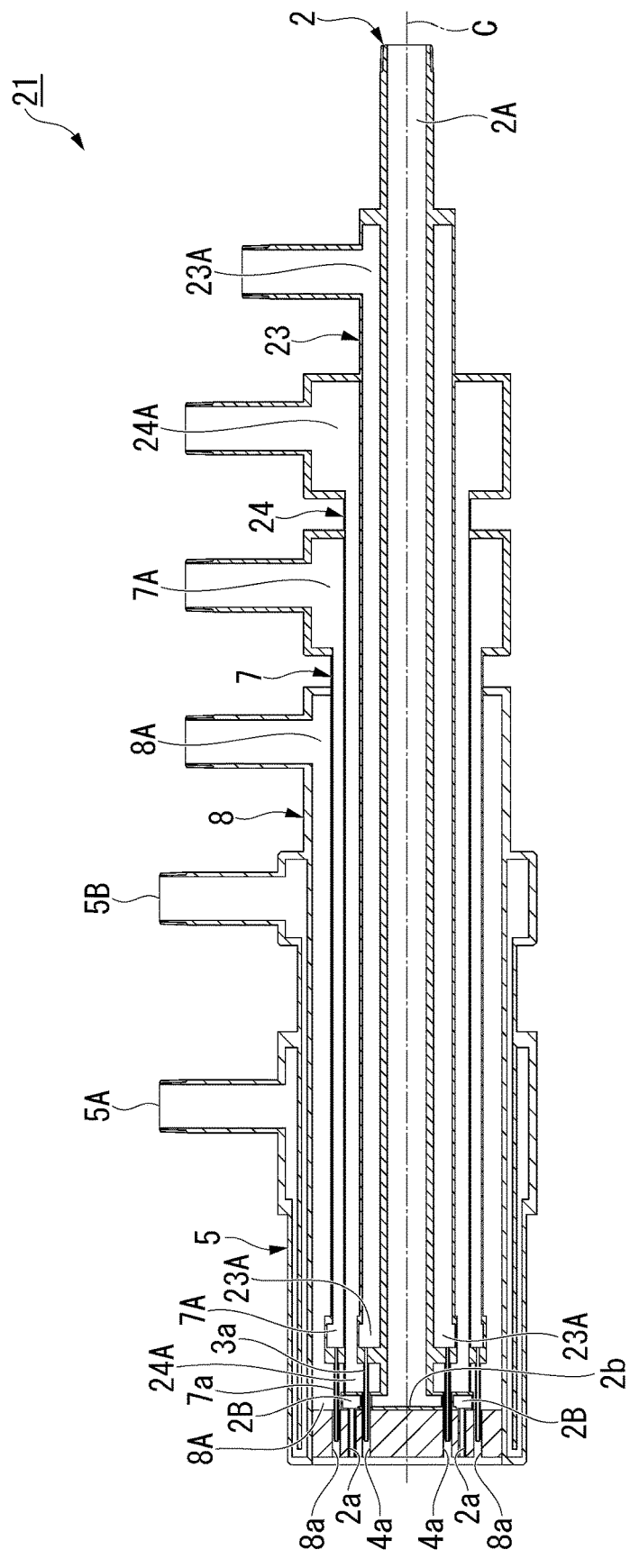
FIG. 8 is a cross-sectional view taken along the line B-B' shown in FIG. 7.
Figure 9:
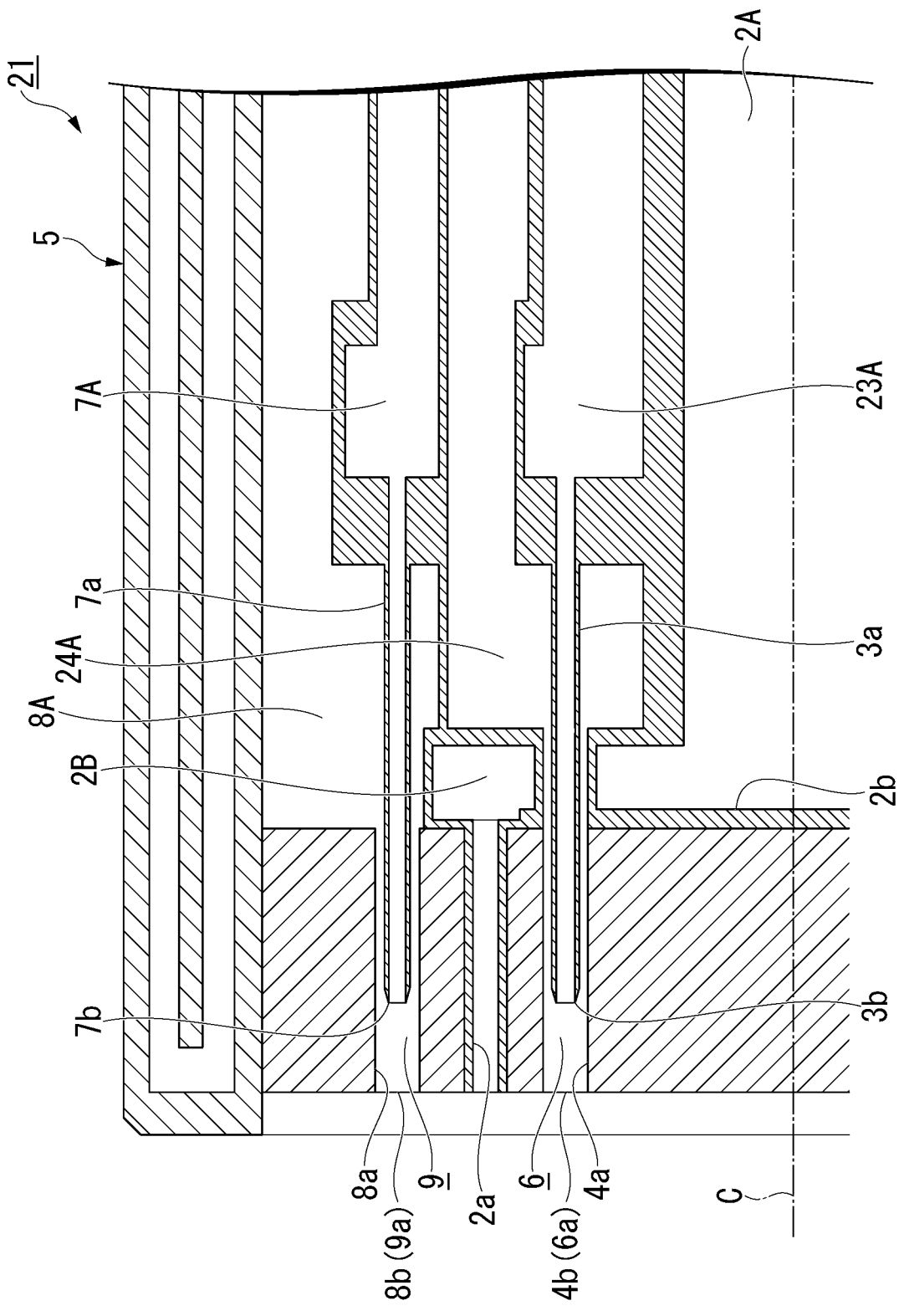
FIG. 9 is an enlarged cross-sectional view of the burner shown in FIG. 8.
Figure 10:
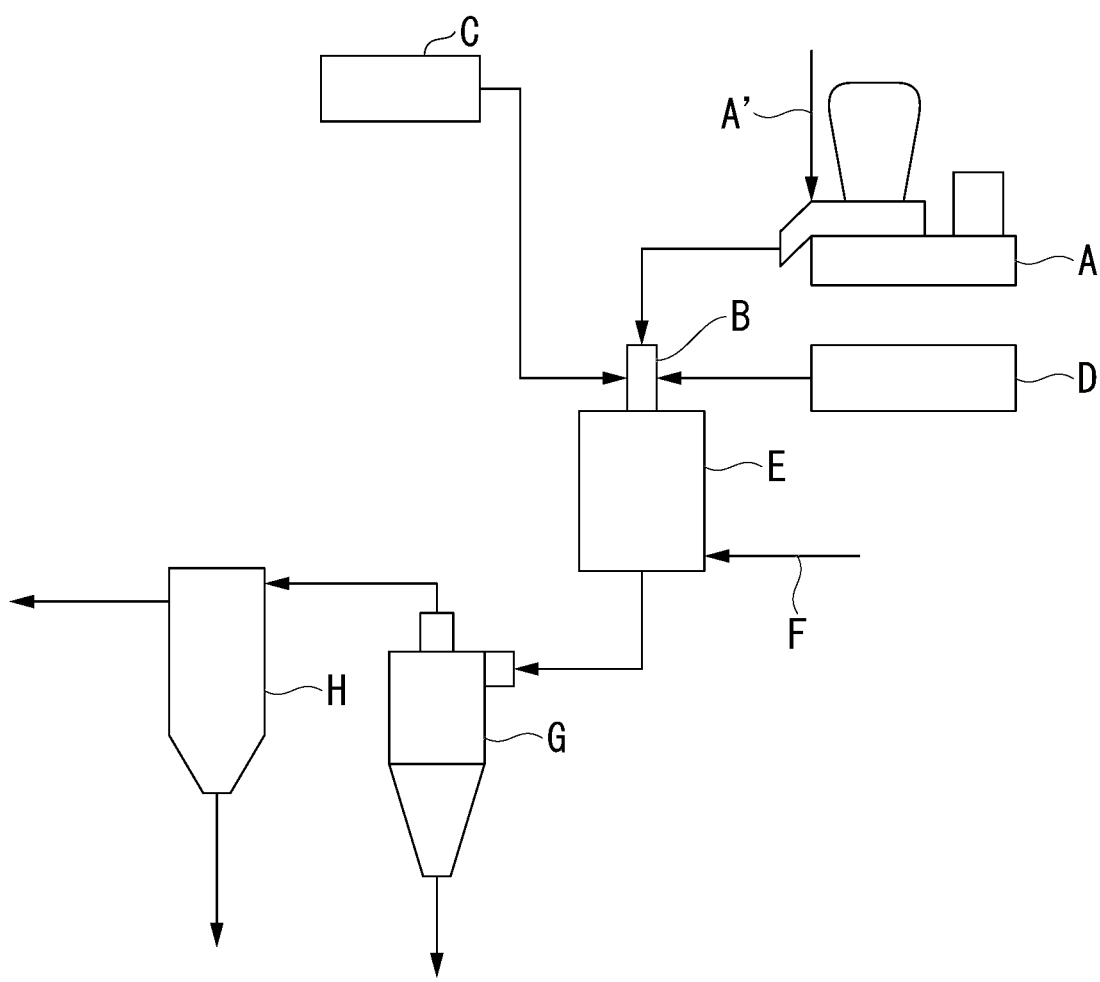
FIG. 10 is a system diagram showing a conventional apparatus for producing inorganic spheroidized particles.

FIGS. 7 to 9 show a burner 21 applicable to the apparatus 30 of the third embodiment, FIG. 7 is a plan view of the burner 21 as viewed from the tip side thereof, and FIG. 8 is a cross-sectional view cut along the line B-B passing through the central axis C of the burner 21, and FIG. 9 is an enlarged cross-sectional view of the tip end side of the burner 21.

As shown in FIGS. 7 to 9, the burner 21 has a concentric multi-pipe structure including the raw material powder supply pipe 2, a first fuel supply pipe 23, a first combustion-supporting gas supply pipe 24, a second fuel supply pipe 7, a second combustion-supporting gas supply pipe 8, and the water-cooling jacket 5 from the central axis C of the burner 21 toward the outside in the circumferential direction. Further, the burner 21 of the present embodiment is an oxygen combustion burner using a fuel gas and a combustion-supporting gas containing oxygen.

As shown in FIG. 7, the first fuel supply pipe 23 is provided so as to cover the outside of the raw material powder supply pipe 2. The central axis of the first fuel supply pipe 23 and the central axis of the raw material powder supply pipe 2 coincide with each other, and the first fuel supply pipe 23 is provided coaxially with the raw material powder supply pipe 2.

The annular space provided between the first fuel supply pipe 23 and the raw material powder supply pipe 2 is the first fuel gas supply path 23A for supplying the first fuel gas. In other words, the first fuel gas supply path 23A is provided so as to cover the outer periphery of the first powder supply path 2A.

The base end side of the first fuel gas supply path 23A is connected to the fuel supply source for auxiliary combustion 18 through the fuel supply line for auxiliary combustion L6 described above.

As the first fuel gas, the fuel for auxiliary combustion can be used, but the first fuel gas is not limited to these gases. As the first fuel gas, as in the first and second embodiments, ammonia ($NH_3$), which is a substance containing no carbon source, may be used.

If necessary, the first fuel gas may be diluted with an inert gas such as nitrogen gas or argon gas.

The tip of the first fuel gas supply path 23A is on the base end side in the axial direction of the burner 21 with respect to the position at which the raw material powder supply path 2A branches into a plurality of the raw material powder supply branched flow paths 2B. Therefore, the first fuel gas supply path 23A is not provided on the outer periphery of the portion near the tip of the first powder supply path 2A.

The annular space near the tip of the first fuel gas supply path 23A has the same or slightly larger outer diameter than that of the base end portion and the central portion. The outer periphery of the annular space near the tip of the first fuel gas supply path 23A is preferably inside the raw material powder ejection holes 2a. As a result, as shown in FIG. 7, when the tip of the burner 21 is viewed in plan view, the first fuel gas for forming a flame (first flame) can be supplied inside a plurality of the raw material powder ejection holes 2a.

As shown in FIGS. 8 and 9, a plurality of the first fuel gas ejection nozzles (first fuel supply branch flow paths) 3a extending in a direction parallel to the axial direction of the burner 21 are connected to the tip of the first fuel gas supply path 23A. The first fuel gas supply path 23A and the space inside the plurality of the first fuel gas ejection nozzles 3a are communicated with each other. As a result, the fuel gas can be supplied from the first fuel gas supply path 23A to the plurality of the first fuel gas ejection nozzles 3a. In other words, the first fuel gas supply path 23A branches into a plurality of the first fuel gas ejection nozzles 3a at a portion near the tip of the burner 21.

As shown in FIG. 8, the first combustion-supporting gas supply pipe 24 is provided so as to cover the outside of the first fuel supply pipe 23. The central axis of the first combustion-supporting gas supply pipe 24 coincides with the central axis of the first fuel supply pipe 23, and the first combustion-supporting gas supply pipe 24 is provided coaxially with the first fuel supply pipe 23 and the raw material powder supply pipe 2.

The annular space provided between the first combustion-supporting gas supply pipe 24 and the first fuel supply pipe 23 is the first combustion-supporting gas supply path 24A for supplying the first combustion-supporting gas. In other words, the first combustion-supporting gas supply path 24A is provided so as to cover the tip and the outer periphery of the first fuel gas supply path 23A.

The base end side of the first combustion-supporting gas supply path 24A is connected to the oxygen supply source 13 through the oxygen supply lines L2 and L2A.

The first combustion-supporting gas is not particularly limited as long as it is a gas capable of reacting with the first fuel gas to form a flame atmosphere, as in the first embodiment. Examples of the first combustion-supporting gas include oxygen, and oxygen-enriched air.

The tip of the first combustion-supporting gas supply path 24A is on the tip side in the axial direction of the burner 21 with respect to the position at which the raw material powder supply path 2A branches into a plurality of the raw material powder supply branched flow paths 2B. Therefore, the first combustion-supporting gas supply path 24A is provided so as to cover the outer periphery of the portion near the tip of the first powder supply path 2A.

The annular space near the tip of the first combustion-supporting gas supply path 24A has a smaller inner diameter than that of the base end portion and the central portion. The inner periphery of the annular space near the tip of the first combustion-supporting gas supply path 24A is preferably inside the raw material powder ejection hole 2a. As a result, as shown in FIG. 7, when the tip of the burner 21 is viewed in plan view, the first combustion-supporting gas for forming the first flame can be supplied inside the plurality of raw material powder ejection holes 2a.

As shown in FIGS. 8 and 9, the tip of the first combustion-supporting gas supply path 24A of which the diameter is expanded from the outside in the circumferential direction of the burner 21 toward the central axis C is connected to a plurality of the first combustion-supporting gas supply holes (first combustion-supporting gas supply branched flow paths) 4a which extend in a direction parallel to the axial direction of the burner 21. The first combustion-supporting gas supply path 24A and the space inside the plurality of the first combustion-supporting gas supply holes 4a are communicated with each other. As a result, the first combustion-supporting gas can be supplied from the first combustion-supporting gas supply path 24A to a plurality of the first combustion-supporting gas supply holes 4a. In other words, the first combustion-supporting gas supply path 24A branches into a plurality of the first combustion-supporting gas supply holes 4a at the portion near the tip of the burner 21.

As shown in FIG. 8, the second fuel supply pipe 7 is provided so as to cover the outside of the first combustion-supporting gas supply pipe 24. The central axis of the first fuel supply pipe 23 coincides with the central axis of the first combustion-supporting gas supply pipe 24, and the second fuel supply pipe 7 is provided coaxially with the first combustion-supporting gas supply pipe 24.

The annular space provided between the second fuel supply pipe 7 and the first combustion-supporting gas supply pipe 24 is the second fuel gas supply path 7A for supplying the second fuel gas. In other words, the second fuel gas supply path 7A is provided so as to cover the outer periphery of the first combustion-supporting gas supply path 24A.

The base end side of the second fuel gas supply path 7A is connected to the ammonia supply source 12 through the ammonia supply line L1.

In the present embodiment, an embodiment in which ammonia gas is used as the second fuel gas will be described as an example, but the present invention is not limited thereto. As the second fuel gas, a gas containing the fuel for auxiliary combustion may be used as in the case of the first fuel gas.

The second fuel gas may be diluted with an inert gas such as nitrogen gas or argon gas, if necessary.

The tip of the second fuel gas supply path 7A is about the same as that of the first fuel gas supply path 23A in the axial direction of the burner 21. Therefore, the second fuel gas supply path 7A is not provided on the outer periphery of the portion near the tip of the first powder supply path 2A.

The annular space near the tip of the second fuel gas supply path 7A has the same or slightly larger outer diameter than that of the base end portion and the central portion. The outer periphery of the annular space near the tip of the second fuel gas supply path 7A is preferably outside the position of the raw material powder ejection holes 2a. As a result, as shown in FIG. 7, when the tip of the burner 21 is viewed in plan view, a second fuel gas for forming a flame (second flame) can be supplied to the outside of the plurality of raw material powder ejection holes 2a.

As shown in FIGS. 8 and 9, a plurality of second fuel gas ejection nozzles (second fuel supply branch flow path) 7a extending in a direction parallel to the axial direction of the burner 21 are connected to the tip of the second fuel gas supply paths 7A. The second fuel gas supply path 7A and the space inside the plurality of the second fuel gas ejection nozzles 7a are communicated with each other. As a result, the second fuel gas can be supplied from the second fuel gas supply path 7A to the plurality of the second fuel gas ejection nozzles 7a. In other words, the second fuel gas supply path 7A branches into a plurality of the second fuel gas ejection nozzles 7a at the portion near the tip of the burner 21.

As shown in FIG. 8, the second combustion-supporting gas supply pipe 8 is provided so as to cover the outside of the second fuel supply pipe 7. The central axis of the second combustion-supporting gas supply pipe 8 coincides with the central axis of the second fuel supply pipe 7, and the second combustion-supporting gas supply pipe 8 is provided coaxially with the second fuel supply pipe 7 and the raw material powder supply pipe 2.

The annular space provided between the second combustion-supporting gas supply pipe 8 and the second fuel supply pipe 7 is the second combustion-supporting gas supply path 8A for supplying the second combustion-supporting gas. In other words, the second combustion-supporting gas supply path 8A is provided so as to cover the tip and the outer periphery of the second fuel gas supply path 7A.

The base end side of the second combustion-supporting gas supply path 8A is connected to the oxygen supply source 13 through the oxygen supply lines L2 and L2C.

The second combustion-supporting gas is not particularly limited as long as it is a gas capable of reacting with the second fuel gas to form a flame atmosphere, like the first combustion-supporting gas. Examples of the second combustion-supporting gas include oxygen and oxygen-enriched air. The second combustion-supporting gas may have the same component as the first combustion-supporting gas, or may have a different component.

The tip of the second combustion-supporting gas supply path 8A is on the tip side in the axial direction of the burner 21 with respect to the position at which the raw material powder supply path 2A branches into a plurality of the raw material powder supply branched flow paths 2B. Therefore, the second combustion-supporting gas supply path 8A is provided so as to cover the outer periphery of the portion near the tip of the first combustion-supporting gas supply path 24.

The annular space near the tip of the second combustion-supporting gas supply path 8A has a smaller inner diameter than that of the base end portion and the central portion. The inner periphery of the annular space near the tip of the second combustion-supporting gas supply path 8A is preferably outside the position of the raw material powder ejection hole 2a. As a result, as shown in FIG. 7, when the tip of the burner 21 is viewed in plan view, the second combustion-supporting gas for forming a flame (second flame) can be supplied outside the plurality of raw material powder ejection holes 2a.

As shown in FIGS. 8 and 9, the tip of the second combustion-supporting gas supply path 8A of which the diameter is expanded from the outside in the circumferential direction of the burner 21 toward the central axis C is connected to a plurality of the second combustion-supporting gas supply holes (second combustion-supporting gas supply branched flow paths) 8a extending in a direction parallel to the axial direction of the burner 21. The second combustion-supporting gas supply path 8A and the space inside a plurality of the second combustion-supporting gas supply holes 8a are communicated with each other. As a result, the second combustion-supporting gas can be supplied from the second combustion-supporting gas supply path 8A to a plurality of the second combustion-supporting gas supply holes 8a. In other words, the second combustion-supporting gas supply path 8A branches into a plurality of the second combustion-supporting gas supply holes 8a at the portion near the tip of the burner 21.

In the burner 21 of the present embodiment, as shown in FIG. 9, the second fuel gas ejection nozzle 7a is located inside the second combustion-supporting gas supply hole 8a. Further, a tip 7b of the second fuel gas ejection nozzle 7a is located inside the second combustion-supporting gas supply hole 8a. That is, the second fuel gas ejection nozzle 7a opens inside the second combustion-supporting gas supply hole 8a.

When the second fuel gas is ejected from the tip 7b of the second fuel gas ejection nozzle 7a into the inside of the second combustion-supporting gas supply hole 8a, the second combustion-supporting gas is supplied from the second combustion-supporting gas supply path 8A toward the inside of the second combustion-supporting gas supply hole 8a. Then, the second fuel gas and the second combustion-supporting gas are mixed inside the second combustion-supporting gas supply hole 8a in front of the tip 7b of the second fuel gas ejection nozzle 7a.

As described above, the space from the tip 7b of the second fuel gas ejection nozzle 7a to a tip 8b of the second combustion-supporting gas supply hole 8a is a second premixing chamber 9 for mixing the second fuel gas and the second combustion-supporting gas. Further, the opening of the tip 8b of the second combustion-supporting gas supply hole 8a becomes the opening 9a of the second premixing chamber 9.

In other words, the burner 21 of the present embodiment includes a plurality of the second premixing chambers 9. These second premixing chambers 9 are located at a position near to the tip of the burner 21 in the axial direction. The second premixing chamber 9 communicates with one of the second fuel gas ejection nozzles 7a and one of the second combustion-supporting gas supply holes 8a. The second premixing chamber 9 opens at the tip of the burner 21 in the axial direction.

A volume v2 of the second premixing chamber 9 is not particularly limited as long as the second fuel gas and the second combustion-supporting gas can be sufficiently mixed and there is no risk of flashback.

The volume v2 [m$^3$] can be the same as the volume v1 of the first premixing chamber 6 described above. That is, when the total flow rate Q1 of the second fuel gas and the second combustion-supporting gas is 25 to 50 [Nm$^3$/h], the volume v2 [m$^3$] is preferably in a range from $3.0\times10^{-5}$ to $1.0\times10^{-3}$ [m$^3$], and more preferably in a range from $1.0\times10^{-4}$ to $1.0\times10^{-3}$ [m$^3$]. When the volume v2 is in the range from $1.0\times10^{-4}$ to $1.0\times10^{-3}$ [m$^3$], the second fuel gas and the second combustion-supporting gas can be sufficiently mixed in the second premixing chamber 9.

Further, an offset distance L2 from the tip 7b of the second fuel gas ejection nozzle 7a to the tip 8b of the second combustion-supporting gas supply hole 8a is preferably in a range from $1.0\times10^{-3}$ to $1.0\times10^{-1}$ [m], and more preferably in a range from $2\times10^{-3}$ to $5\times10^{-2}$ [m] as in the offset distance L1 described above.

Further, the number and the volume of the second premixing chamber 9 can be appropriately selected according to the supply amount of the mixed gas of the second fuel gas and the second combustion-supporting gas, the number and the volume and the layout (arrangement) of the raw material powder ejection hole 2a.

In the second premixing chamber 9, the second fuel gas and the second combustion-supporting gas are mixed in advance and ejected as a mixed gas from the opening 9a in a direction parallel to the axial direction of the burner 21.

The burner 21 includes a plurality of the first premixing chambers 6 having a small volume and the second premixing chambers 9 having a small volume, the first fuel gas and the first combustion-supporting gas are premixed in the first premixing chamber 6, and the second fuel gas and the second combustion-supporting gas are mixed in the second premixing chamber 9. As a result, the fuel gas and the combustion-supporting gas can be sufficiently mixed to improve the combustion efficiency, and there is no risk of flashback.

According to the burner 21 of the present embodiment, as shown in FIG. 7, when the tip of the burner 21 is viewed in plan view, a plurality of the openings 6a of the first premixing chamber 6 are arranged at equal intervals inside the raw material powder ejection holes 2a arranged in an annular shape centered on the central axis C of the burner 21 so as to be concentric circles, a plurality of the openings 9a of the second premixing chamber 9 are arranged at equal intervals outside the raw material powder ejection holes 2a so as to be concentric circles. That is, the raw material powder ejection holes 2a are surrounded inside by the openings 6a of the first premixing chambers 6 and outside by the openings 9a of the second premixing chambers 9.

In other words, in the burner 21 of the present embodiment, in order to form the flame (first flame) by the mixed gas of the first fuel gas and the first combustion-supporting gas in the central portion (central portion) of the burner 21, the openings 6a of a plurality of the first premixing chambers 6 are arranged in an annular shape, and a plurality of the raw material powder ejection holes 2a are arranged in an annular shape so as to surround the outer periphery of the first flame. Further, in order to form the flame (second flame) by the mixed gas of the second fuel gas and the second combustion-supporting gas so as to surround the outer periphery of the raw material powder ejection holes 2a on the outside of the plurality of raw material powder ejection holes 2a, the openings 9a of a plurality of the second premixing chambers 9 are arranged in an annular shape. As a result, the heat of the flame can be efficiently transferred to the raw material powder ejected from the raw material powder ejection holes 2a, and the raw material powder can be efficiently melted.

Further, by forming the second flame so as to surround the outer periphery of the raw material powder ejection holes 2a, the entrained air from the periphery of the burner 21 or the combustion exhaust gas in the furnace can be blocked, so that the efficiency of melting and spheroidizing of the inorganic powder can be improved.

Further, according to the burner 21 of the present embodiment, the flow rate of the first fuel gas for forming the first flame and the flow rate of the second fuel gas for forming the second flame are independently controlled, and the flow rate of the first combustion-supporting gas for forming the first flame and the flow rate of the second combustion-supporting gas for forming the second flame can be controlled independently. This makes it possible to create an appropriate combustion state for the raw material powder ejected from the tip of the burner 21.

The ammonia supply line L1 is located between the ammonia supply source 12 and the burner 21. Specifically, the ammonia supply line L1 communicates with the base end side of the second fuel gas supply path 7A of the burner 21. In other words, the ammonia supply source 12 and the second fuel gas supply path 7A are connected through the ammonia supply line L1. As a result, the ammonia gas can be supplied to the burner 21 as the second fuel gas from the ammonia supply source 12.

The oxygen supply line L2 is located between the oxygen supply source 13 and the burner 21.

Further, the oxygen supply line L2 branches into L2A, L2B and L2C at the Q1 point.

The oxygen supply line L2 is provided with a heat exchanger H1 described later. Further, the oxygen supply line L2 may be provided with a vaporizer (not shown) for vaporizing liquid oxygen.

The branched oxygen supply line L2C is provided with a flow rate-adjusting valve V5.

The branched oxygen supply line L2A communicates with the base end side of the first combustion-supporting gas supply path 24A of the burner 21. In other words, the oxygen supply source 13 and the first combustion-supporting gas supply path 24A are connected through the oxygen supply lines L2 and L2A. As a result, oxygen gas can be supplied to the burner 21 as the first combustion-supporting gas from the oxygen supply source 13.

Further, the branched oxygen supply line L2B communicates with the base end side of the raw material powder supply path 2A of the burner 21. In other words, the oxygen supply source 13 and the raw material powder supply path 2A are connected through the oxygen supply lines L2 and L2B. As a result, oxygen gas can be supplied to the burner 21 as the carrier gas.

Further, the branched oxygen supply line L2C communicates with the base end side of the second combustion-supporting gas supply path 8A of the burner 21. In other words, the oxygen supply source 13 and the second combustion-supporting gas supply path 8A are connected through the oxygen supply lines L2 and L2C. As a result, oxygen gas can be supplied to the burner 21 as a second combustion-supporting gas from the oxygen supply source 13.

The raw material powder supply source 14 is a facility for storing the raw material powder, and is provided in the branched oxygen supply line L2B. The raw material powder supply source 14 and the raw material powder supply path 2A are connected through the oxygen supply line L2B. As a result, the inorganic powder, which is the raw material powder, can be supplied to the burner 11 together with the carrier gas (oxygen gas).

The form of the raw material powder supply source 14 is not particularly limited. For example, the raw material powder supply source 14 may have a raw material tank, a raw material-cutting mechanism, and the like.

The cooling-water circulation line L3 is located between the cooling-water outlet 5B and the cooling-water inlet 5A of the water-cooling jacket 5 in the burner 21. The cooling-water circulation line L3 is provided with the cooling tower CT for storing cooling-water, the pump P1, the heat exchanger H1, the heat exchanger H3, and the heat exchanger H2.

In the cooling-water circulation line L3, the cooling-water in the cooling tower CT is supplied from the inlet 5A into the water-cooling jacket 5 by the pump P1 and discharged from the outlet 5B after the cooling of the burner 11 is completed. Next, high-temperature cooling-water discharged from the water-cooling jacket 5 is cooled by heat exchange with low-temperature liquefied oxygen or oxygen gas in the heat exchanger H1 provided over the cooling-water circulation line L3 and the oxygen supply line L2. Further, the cooling-water is then cooled by heat exchange with the low-temperature fuel for auxiliary combustion in the heat exchanger H3 provided over the cooling-water circulation line L3 and the fuel supply line for auxiliary combustion L6. Further, the cooling-water is cooled by heat exchange with low-temperature liquefied ammonia or ammonia gas in the heat exchanger H2 provided over the cooling-water circulation line L3 and the ammonia supply line L1, and then supplied into the cooling tower CT.

The fuel supply line for auxiliary combustion L6 is located between the fuel supply source for auxiliary combustion 18 and the burner 21. Specifically, the fuel supply line for auxiliary combustion L6 communicates with the base end side of the first fuel gas supply path 23A of the burner 21. In other words, the fuel supply source for auxiliary combustion 18 and the first fuel gas supply path 23A are connected through the fuel supply line for auxiliary combustion L6. As a result, the fuel for auxiliary combustion can be supplied to the burner 21 as the first fuel gas from the fuel supply source for auxiliary combustion 18.

(Method for Producing Inorganic Spheroidized Particles)

Next, a method for producing spheroidized particles using the apparatus 30 provided with the burner 21 will be described.

In the method for producing inorganic spheroidized particles of the present embodiment, the inorganic powder is melted and spheroidized by a burner flame formed by the combustion of the fuel gas and the combustion-supporting gas containing oxygen.

In the method for producing inorganic spheroidized particles of the present embodiment, ammonia gas containing no carbon source is used as at least one of the first and second fuel gases. In order to efficiently combust the ammonia gas, the fuel gas and the combustion-supporting gas are supplied into a plurality of the first premixing chambers 6 and a plurality of the second premixing chambers 9 of the burner 21, and the fuel gas and the combustion-supporting gas are mixed in advance and then combusted to generate a flame. The inorganic powder is put into the flame.

In the method for producing inorganic spheroidized particles of the present embodiment, the supply of the fuel gas and that of the combustion-supporting gas to the first and second fuel gas ejection nozzles of the burner 21 are independent of each other. As a result, a substance containing a carbon source can be supplied to the first fuel gas ejection nozzle as the fuel for auxiliary combustion, and ammonia ($NH_3$) can be supplied to the second fuel gas ejection nozzle as the fuel gas.

In particular, ammonia has a lower combustion property than conventional gas fuels containing carbon sources and hydrogen. Therefore, when ammonia is used as the fuel gas, the flame temperature of the burner can be maintained high while reducing the carbon dioxide generated during combustion, and the raw material powder can be efficiently melted by supplying the fuel for auxiliary combustion to the first fuel gas ejection nozzle 3a. Further, the fuel for auxiliary combustion may be used only at the time of ignition, and the supply of the fuel for auxiliary combustion may be stopped after the combustion of the burner 21 is stabilized.

As described above, according to the apparatus 30 of the present embodiment and the method for producing inorganic spheroidized particles, the same effects as those of the first and second embodiments can be obtained.

Further, according to the apparatus 30 of the present embodiment, the supply of the fuel gas to the first fuel gas ejection nozzle 3a of the burner 21 and the supply of the fuel gas to the second fuel gas ejection nozzle 7a are independent of each other. It is possible to independently control the flow rates of the first fuel gas and the first combustion-supporting gas for forming the first flame and the flow rates of the second fuel gas and the second combustion-supporting gas for forming the second flame. As a result, even when ammonia gas is used as the fuel gas, it is possible to create an appropriate combustion state for the raw material powder ejected from the tip of the burner 21.

The technical scope of the present invention is not limited to the embodiments above, and various modifications can be made without departing from the spirit of the present invention. For example, in order to use ammonia as the fuel gas and to use the fuel for auxiliary combustion when the burner 11 is ignited, the ammonia supply line L1 and the fuel supply line for auxiliary combustion L6 are merged in the apparatus 20. This configuration may be applied to the third embodiment.

The mode for supplying the fuel for auxiliary combustion to the burner 11 of the second embodiment and the burner 21 of the third embodiment is not particularly limited.

For example, it suffices that the first fuel gas supply path 3A or the second fuel gas supply path 7A is connected to the fuel supply source for auxiliary combustion 18, and the fuel for auxiliary combustion can be supplied to the first fuel gas ejection nozzle 3a or the second fuel gas ejection nozzle 7a.

Further, in the first premixing chambers 6 or the second premixing chambers 9 to which fuel for auxiliary combustion is supplied, it may be possible to change from a mixed combustion of ammonia and fuel for auxiliary combustion to a combustion of 100% ammonia.

Further, in the apparatus 30 for producing inorganic spheroidized particles and the method for producing inorganic spheroidized particles of the third embodiment, the embodiment in which a substance containing a carbon source is supplied to the first fuel gas ejection nozzle of the burner 21 as a fuel for auxiliary combustion, and ammonia ($NH_3$) is supplied to the second fuel gas ejection nozzle as the fuel gas has been described. However, the present invention is not limited to this embodiment. For example, ammonia ($NH_3$) may be supplied to the first fuel gas ejection nozzle of the burner 21 as a fuel gas, and a substance containing a carbon source may be supplied to the second fuel gas ejection nozzle as a fuel for auxiliary combustion.

INDUSTRIAL APPLICABILITY

The present invention can provide a burner for producing inorganic spheroidized particles, an apparatus for producing inorganic spheroidized particles, and a method for producing inorganic spheroidized particles, which can significantly reduce the amount of warming gas generated and suppress the generation of soot during combustion.

DESCRIPTION OF REFERENCE NUMERAL 10, 20, 30 apparatus for producing inorganic spheroidized particles (apparatus)
11, 21 burner (burner for inorganic spheroidized particles producing)
2A raw material powder supply path
2B raw material powder supply branched flow path
2a raw material powder ejection hole
3A, 23A first fuel gas supply path
3a first fuel gas ejection nozzle (first fuel supply branched flow path)
3b tip of the first fuel supply branched flow path
4A, 24A first combustion-supporting gas supply path
4a first combustion-supporting gas supply hole (first combustion-supporting gas supply branched flow path)
4b tip of the first combustion-supporting gas supply branched flow path
6 first premixing chamber
6a opening of the first premixing chamber
7 second fuel gas supply path
7a second fuel gas ejection nozzle (second fuel supply branched flow path)
7b tip of the second fuel supply branched flow path
8 second combustion-supporting gas supply path
8a second combustion-supporting gas supply hole (second combustion-supporting gas supply branched flow path)
8b tip of the second combustion-supporting gas supply branched flow path
9 second premixing chamber
9a opening of the second premixing chamber
12 ammonia supply source
13 oxygen supply source
14 raw material powder supply source
15 spheroidizing furnace
16 cyclone
17 bag filter
18 fuel supply source for auxiliary combustion
L1 ammonia supply line
L2 oxygen supply line
L3 cooling-water circulation line
L6 fuel supply line for auxiliary combustion
C central axis of burner
H1, H2, H3 heat exchanger

The invention claimed is:
1. Apparatus for producing inorganic spheroidized particles, comprising:
a burner for producing inorganic spheroidized particles which uses a fuel gas containing ammonia and a combustion-supporting gas containing oxygen, the burner including a plurality of internal supply paths, including a first supply path, a second supply path, and a third supply path;
a vertical spheroidizing furnace in which the burner for producing inorganic spheroidized particles is mounted vertically downward on a top thereof;
an ammonia supply source;
an oxygen supply source;
an ammonia supply line located between the ammonia supply source and the burner for producing inorganic spheroidized particles; and
an oxygen supply line located between the oxygen supply source and the burner for producing inorganic spheroidized particles,
wherein the apparatus further comprises:
a fuel supply source for auxiliary combustion, the fuel supply source for auxiliary combustion being separate from the ammonia supply source and including fuel for auxiliary combustion configured to reduce carbon diox- ide generated during combustion, the fuel for auxiliary combustion being different than the fuel gas, and a fuel supply line for auxiliary combustion located between the fuel supply source for auxiliary combustion and the burner for producing inorganic spheroidized particles, wherein the oxygen supply line is connected to the second supply path in the burner that is different from the first supply path of the fuel gas for the auxiliary combustion in the burner and the third supply path of the ammonia in the burner, and wherein the oxygen supply line is different from the ammonia supply line and the fuel supply line for auxiliary combustion.

2. The apparatus for producing inorganic spheroidized particles according to claim 1, wherein the apparatus further comprises a cyclone and a bag filter located downstream of the vertical spheroidizing furnace.

3. Apparatus for producing inorganic spheroidized particles, comprising:
   a burner for producing inorganic spheroidized particles which uses a fuel gas containing ammonia and a combustion-supporting gas containing oxygen;
   a vertical spheroidizing furnace in which the burner for producing inorganic spheroidized particles is mounted vertically downward on a top thereof;
   an ammonia supply source;
   an oxygen supply source;
   an ammonia supply line located between the ammonia supply source and the burner for producing inorganic spheroidized particles; and
   an oxygen supply line located between the oxygen supply source and the burner for producing inorganic spheroidized particles;
   wherein the apparatus further comprises a fuel supply line for auxiliary combustion located between a fuel supply source for auxiliary combustion and the burner for producing inorganic spheroidized particles, the fuel supply source for auxiliary combustion being separate from the ammonia supply source and including a fuel for auxiliary combustion configured to reduce carbon dioxide generated during combustion, the fuel for auxiliary combustion being different than the fuel gas, and
   wherein the burner for producing inorganic spheroidized particles comprises:
      a raw material powder supply path inside the burner which supplies inorganic powder as raw material powder;
      a first fuel gas supply path inside the burner which supplies a first fuel gas and has a first combustion-supporting gas supply path inside the burner which supplies a first combustion-supporting gas; and
      a first premixing chamber configured to mix the first fuel gas and the first combustion-supporting gas at a space located between a tip of the first fuel gas supply path and a tip of the first combustion-supporting gas supply path,
   wherein the ammonia supply line and the first fuel gas supply path are communicated with each other; and
   wherein the oxygen supply line and the first combustion-supporting gas supply path are communicated with each other,
   wherein the burner for producing inorganic spheroidized particles further comprises:
      a second fuel gas supply path which supplies a second fuel gas, and
      a second combustion-supporting gas supply path which supplies a second combustion-supporting gas, and
   wherein the burner for producing inorganic spheroidized particles further comprises a second premixing chamber configured to mix the second fuel gas and the second combustion-supporting gas at a space located between a tip of the second fuel gas supply path and a tip of the second combustion-supporting gas supply path.

4. The apparatus for producing inorganic spheroidized particles according to claim 3, wherein the fuel supply line for auxiliary combustion and the first fuel gas supply path are communicated with each other.

5. The apparatus for producing inorganic spheroidized particles according to claim 4, wherein
   the second fuel gas supply path and one or both of the ammonia supply line and the fuel supply line for auxiliary combustion are communicated with each other, and
   the oxygen supply line and the second combustion-supporting gas supply path are communicated with each other.

6. The apparatus for producing inorganic spheroidized particles according to claim 1, wherein the burner for producing inorganic spheroidized particles further comprises a water-cooling jacket, and a cooling-water circulation line which is provided between a cooling-water inlet and a cooling-water outlet of the water-cooling jacket.

7. The apparatus for producing inorganic spheroidized particles according to claim 6, wherein the apparatus further comprises a heat exchanger which is provided in the ammonia supply line and the cooling-water circulation line.

8. The apparatus for producing inorganic spheroidized particles according to claim 3, wherein the burner for producing inorganic spheroidized particles further comprises a water-cooling jacket, and a cooling-water circulation line which is provided between a cooling-water inlet and a cooling-water outlet of the water-cooling jacket.

9. The apparatus for producing inorganic spheroidized particles according to claim 8, wherein the apparatus further comprises a heat exchanger which is provided in the ammonia supply line and the cooling-water circulation line.

10. The apparatus for producing inorganic spheroidized particles according to claim 1, wherein the fuel supply source for auxiliary combustion supplies a gaseous fuel.

11. The apparatus for producing inorganic spheroidized particles according to claim 10, wherein the gaseous fuel is methane or propane.

* * * * *